United States Patent [19]
Skinner et al.

[11] Patent Number: 6,085,198
[45] Date of Patent: Jul. 4, 2000

[54] INTEGRATED THREE-TIER APPLICATION FRAMEWORK WITH AUTOMATED CLASS AND TABLE GENERATION

[75] Inventors: Brian Skinner, Mountain View, Calif.; Andy Kittridge Turk, Brooklyn, N.Y.; Kevin McDonnell, Union City, Calif.; Chiaming Yang, Fremont, Calif.; Vanessa McDonnell, Union City, Calif.

[73] Assignee: Sun Microsystems, Inc., Palo Alto, Calif.

[21] Appl. No.: 09/092,610

[22] Filed: Jun. 5, 1998

[51] Int. Cl.[7] .................................................. G06F 707/103
[52] U.S. Cl. ........................ 707/103; 707/101; 707/102; 707/203
[58] Field of Search ........................................ 707/1–206

[56] References Cited

U.S. PATENT DOCUMENTS

| | | | |
|---|---|---|---|
| 5,925,100 | 7/1999 | Drewry et al. | 709/219 |
| 5,950,006 | 9/1999 | Crater et al. | 395/705 |
| 5,987,497 | 11/1999 | Allgeier | 709/201 |
| 5,987,514 | 11/1999 | Rangarajan | 709/224 |
| 5,995,972 | 9/1999 | Allgeier | 707/103 |

*Primary Examiner*—Thomas G. Black
*Assistant Examiner*—David Jung
*Attorney, Agent, or Firm*—Finnegan, Henderson, Farabow, Garrett & Dunner, L.L.P.

[57] ABSTRACT

An integrated three-tier application framework with automated class and database table generation. Schema information in the form of metadata structures is used to generate data classes for the client tier and the application tier. Corresponding client tier and application tier data classes implement a common interface that supports generalized access by other system components. Based on the schema information, factory classes are automatically generated for the client tier and application tier which permit instantiation of the generated data classes. Also, database configuration is automated by the generation of database table creation commands from the schema information. In one embodiment, a framework of management components are provided for both the client and application tiers to handle inter-tier communication, transparent caching of data objects in a public store, handling of changes to data via change objects, handling of updates in response to data changes, and resolution of query objects into database queries. Common methods are generated within each data class which recognize the use of a public store and the application of a change object scheme. Further, methods and attributes are inherited from framework superclasses that identify and interface with a public store, and that confer the concept of identity on a data class, as well as the ability to discover the attributes of the data class.

7 Claims, 12 Drawing Sheets

```
MetaParameter                              505
   String myName;
   MetaDataType myDataType;
```

```
MetaDataType                                     506
   Vector ourTypes; // MetaDataType
   int myToken;
   String myTokenName;
   String myJavaDeclaration;
   String myJavaInterfaceDeclaration;
   String myDatabaseDeclaration;
   String myDatabaseLength;
   MetaClass myReferenceType;
   String myObjectifier;
   String myDeobjectifier;
   boolean myPassByCopyFlag;
   String myCollectionContentName;
   String myNullValueString;
```

*FIG. 5B*

INTEGRATED THREE-TIER APPLICATION FRAMEWORK WITH AUTOMATED CLASS AND TABLE GENERATION

BACKGROUND OF THE INVENTION

1. Field of the Invention

This invention relates to the field of computer software, and, more specifically, to multi-tier software applications.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, SPARC, Java, JavaBeans and all Java-based trademarks and logos are trademarks or registered trademarks of Sun Microsystems, Inc. in the United States and other countries.

2. Background Art

In the computer industry, an application architecture that is becoming more widely used, particularly in the Internet environment, is the three-tier application architecture, or three-tier architecture. In this architecture, a client communicates requests to a server for data, software and services, for example, and the server responds to the requests which may entail communication with a database management system for the storage and retrieval of persistent data. The three tier architecture includes a database tier that includes a database server, an application tier that includes an application server and application logic (i.e., software application programs, functions, etc.), and a client tier. The application server responds to application requests (e.g., a request for a software applet, etc.) received from the client. The application server forwards data requests to the database server. An enterprise's application (e.g., a scheduling, accounting or personnel application) may involve all three tiers as data that is used by the application may be stored in a database.

Unfortunately, in the development of three-tier applications, the development of the client software, the application server software, and the database configuration are performed as independent processes, often with much inefficiency and redundancy of design. Support for handling changes to and updates of data must be provided not only between multiple clients and the application server in a reliable and efficient manner, but between the application server and the database as well. Further, the addition of new forms of data, or the revision of current forms, may require that the client software and application server software be rewritten to accommodate the new or revised data structures.

FIG. 2 provides an overview of a three-tier architecture. Client tier 202 typically consists of a computer system that provides a graphic user interface (GUI) generated by a client 206, such as a browser or other user interface application. Client 206 generates a display from, for example, a specification of GUI elements (e.g., a file containing input, form, and text elements defined using the Hypertext Markup Language (HTML)) and/or from an applet (i.e., a program such as a program written using the Java™ programming language that runs when it is loaded by the browser).

Further application functionality is provided by application logic managed by application server 210 in application tier 216. The apportionment of application functionality between client tier 202 and application tier 216 is dependent upon whether a "thin client" or "thick client" topology is desired. Database tier 218 contains the data that is accessed by the application logic in application tier 216. Database server 212 manages the data, its structure and the operations that can be performed on the data and/or its structure.

Application server 210 can include applications such as a corporation's scheduling, accounting, personnel and payroll applications, for example. Application server 210 manages requests for the applications that are stored therein. Application server 210 can also manage the storage and dissemination of production versions of enterprise application logic (i.e., the versions that are currently being used by the corporate users). Database server 212 manages the database (s) that manage data for applications. Database server 212 responds to requests to access the scheduling, accounting, personnel and payroll applications' data, for example.

Connection 204 is used to transmit enterprise data between client tier 202 and application tier 216, and may also be used to transfer the enterprise application logic to client tier 202. The client tier can communicate with the application tier via, for example, a Remote Method Invocator (RMI) application programming interface (API) available from Sun Microsystems™. The RMI API provides the ability to invoke methods, or software modules, that reside on another computer system. Parameters are packaged and unpackaged for transmittal to and from the client tier. Connection 214 between application server 210 and database server 212 represents the transmission of requests for data and the responses to such requests from applications that reside in application server 210.

Elements of the client tier, application tier and database tier (e.g., client 206, application server 210 and database server 212) may execute within a single computer. However, in a typical system, elements of the client tier, application tier and database tier may execute within separate computers interconnected over a network such as a LAN (local area network) or WAN (wide area network).

SUMMARY OF THE INVENTION

An integrated three-tier application framework with automated class and database table generation is described. Schema information in the form of metadata structures is used to generate data classes for the client tier and the application tier. Corresponding client tier and application tier data classes implement a common interface that supports generalized access by other system components. Based on the schema information, factory classes are automatically generated for the client tier and application tier which permit instantiation of the generated data classes. Also, database configuration is automated by the generation of database table creation commands from the schema information.

In one embodiment, a framework of management components are provided for both the client and application tiers to handle inter-tier communication, transparent caching of data objects in a public store, handling of changes to data via change objects, handling of updates in response to data changes, and resolution of query objects into database queries. Common methods are generated within each data class which recognize the use of a public store and the application of a change object scheme. Further, methods and attributes are inherited from framework superclasses that confer the concept of identity on a data class, as well as the ability to discover the attributes of the data class.

BRIEF DESCRIPTION OF THE DRAWINGS

FIGS. 5A and 5B are block diagrams illustrating metadata structures in accordance with an embodiment of the invention.

DETAILED DESCRIPTION OF THE INVENTION

Figure 1:
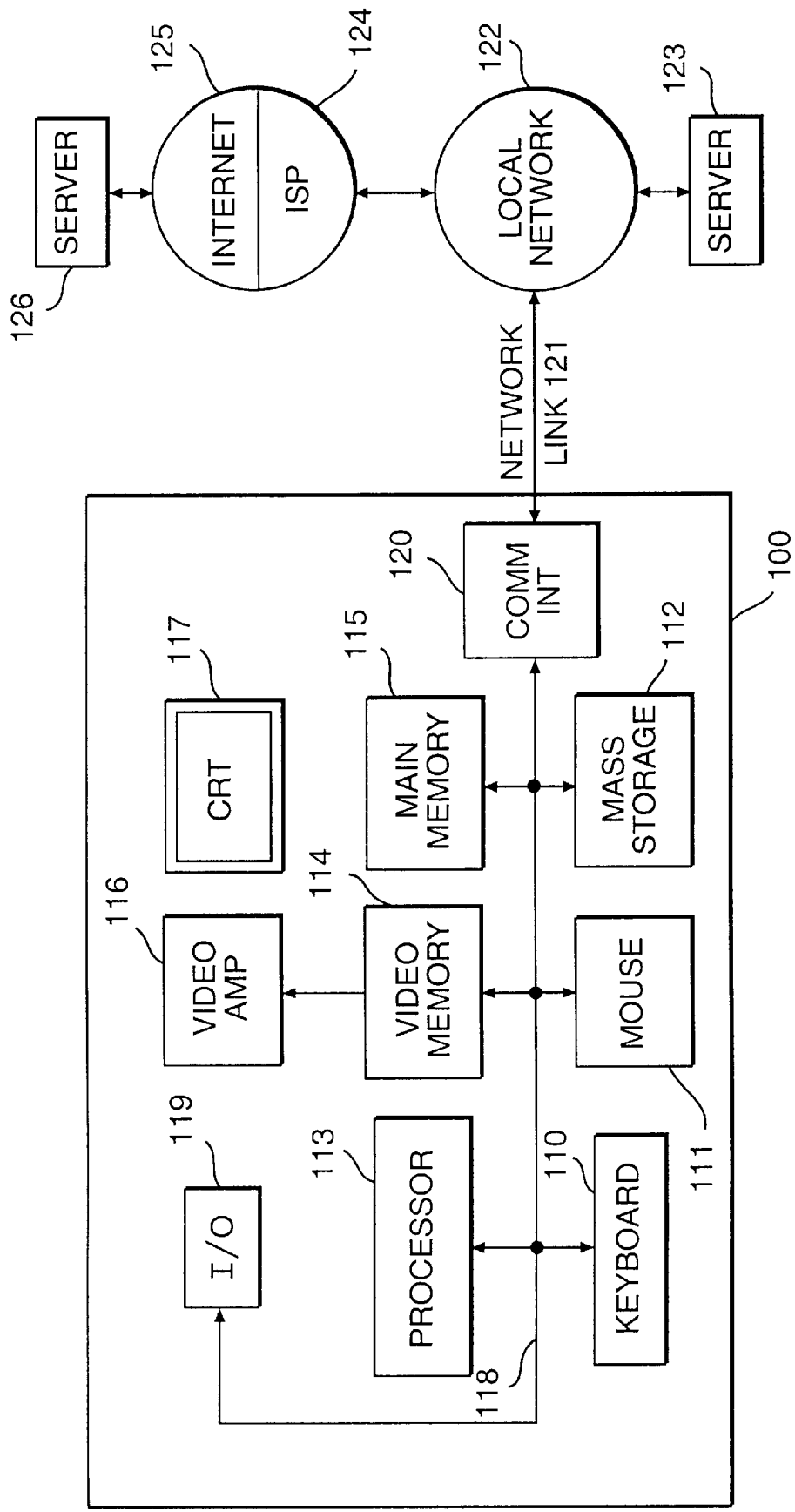
FIG. 1 is a block diagram of one embodiment of a computer system capable of providing a suitable execution environment for an embodiment of the invention.
Figure 2:
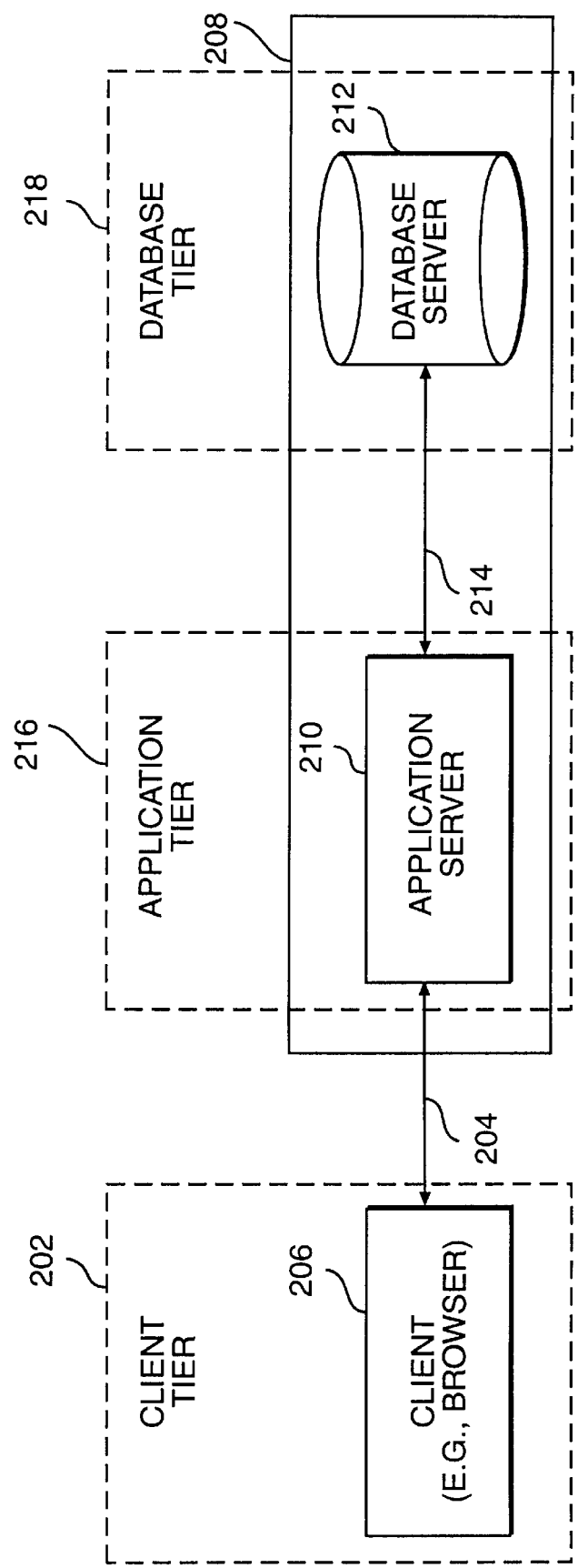
FIG. 2 is a general block diagram of a three-tier system.

The invention is an integrated three-tier application framework with automated class and database table generation. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

An embodiment of the invention comprises a three-tier application framework having system management components that handle the representation of data in the form of data objects on the client tier and server tier. The data objects implement a common interface whether the data objects are resident on the client tier or the application tier. Application-specific logic on the client tier and application tier may access the data objects in the same manner, with storage and retrieval of persistent information in the database occurring transparently to the application specific logic.

An object cache is provided on the client tier and the application tier to return pointers to data objects in response to object IDs. Application queries are performed via query objects. A query object is resolved against the object cache if the query object contains only object IDs. Otherwise, the query object is converted into a database query. The results of a database query are packaged into one or more data objects and returned.

Changes to data are handled via change objects that encapsulate the changes being made. Change objects are produced automatically by data objects, and propagated transparently from the originating tier to the database tier in a transaction-based scheme by change management components in the client and application tiers. As the change objects propagate through the client and application tiers, the change objects may be applied to the corresponding data objects in the object caches. Updates of changes made are propagated to interested components via update management components on the client and application tiers. Change objects and query objects are transmitted between the client and application tiers by communication management components using serialization and reflection techniques.

To accommodate data structures for new enterprise applications, a developer provides schema information about the data classes. A code generator converts the schema information into metadata structures and generates data class definitions for the client tier and application tier that can interface with the framework management components. Class factories are also generated that provide factory methods for creating new instances of the data classes. The schema information in the metadata structures is used by the code generator to generate a schema class that can configure the database, at runtime, by generating "create table" commands to support the persistent attributes of the data classes. A more efficient development process is thus achieved with automated generation procedures that assist in integrating data classes with the three-tier application framework.

A description is given below of an embodiment of a computer apparatus suitable for providing an execution environment for the software apparatus of the invention.

Embodiment of Computer Execution Environment (Hardware)

An embodiment of the invention can be implemented as computer software in the form of computer readable code executed on a general purpose computer such as computer 100 illustrated in FIG. 1, or in the form of bytecode class files executable within a Java runtime environment running on such a computer. A keyboard 110 and mouse 111 are coupled to a bi-directional system bus 118. The keyboard and mouse are for introducing user input to the computer system and communicating that user input to processor 113. Other suitable input devices may be used in addition to, or in place of, the mouse 111 and keyboard 110. I/O (input/output) unit 119 coupled to bidirectional system bus 118 represents such I/O elements as a printer, A/V (audio/video) I/O, etc.

Computer 100 includes a video memory 114, main memory 115 and mass storage 112, all coupled to bidirectional system bus 118 along with keyboard 110, mouse 111 and processor 113. The mass storage 112 may include both fixed and removable media, such as magnetic, optical or magnetic optical storage systems or any other available mass storage technology. Bus 118 may contain, for example, thirty-two address lines for addressing video memory 114 or main memory 115. The system bus 118 also includes, for example, a 32-bit data bus for transferring data between and among the components, such as processor 113, main memory 115, video memory 114 and mass storage 112. Alternatively, multiplex data/address lines may be used instead of separate data and address lines.

In one embodiment of the invention, the processor 113 is a microprocessor manufactured by Motorola, such as the 680X0 processor or a microprocessor manufactured by Intel, such as the 80X86, or Pentium processor, or a SPARC™ microprocessor from Sun Microsystems, Inc. However, any other suitable microprocessor or microcomputer may be utilized. Main memory 115 is comprised of dynamic random access memory (DRAM). Video memory 114 is a dual-ported video random access memory. One port of the video memory 114 is coupled to video amplifier 116. The video amplifier 116 is used to drive the cathode ray tube (CRT) raster monitor 117. Video amplifier 116 is well known in the art and may be implemented by any suitable apparatus. This circuitry converts pixel data stored in video memory 114 to a raster signal suitable for use by monitor 117. Monitor 117 is a type of monitor suitable for displaying graphic images.

Computer 100 may also include a communication interface 120 coupled to bus 118. Communication interface 120 provides a two-way data communication coupling via a network link 121 to a local network 122. For example, if communication interface 120 is an integrated services digital network (ISDN) card or a modem, communication interface 120 provides a data communication connection to the corresponding type of telephone line, which comprises part of network link 121. If communication interface 120 is a local area network (LAN) card, communication interface 120 provides a data communication connection via network link 121 to a compatible LAN. Wireless links are also possible. In any such implementation, communication interface 120 sends and receives electrical, electromagnetic or optical signals which carry digital data streams representing various types of information.

Network link 121 typically provides data communication through one or more networks to other data devices. For example, network link 121 may provide a connection through local network 122 to local server computer 123 or to data equipment operated by an Internet Service Provider (ISP) 124. ISP 124 in turn provides data communication services through the world wide packet data communication network now commonly referred to as the "Internet" 125. Local network 122 and Internet 125 both use electrical, electromagnetic or optical signals which carry digital data streams. The signals through the various networks and the signals on network link 121 and through communication interface 120, which carry the digital data to and from computer 100, are exemplary forms of carrier waves transporting the information.

Computer 100 can send messages and receive data, including program code, through the network(s), network link 121, and communication interface 120. In the Internet example, remote server computer 126 might transmit a requested code for an application program through Internet 125, ISP 124, local network 122 and communication interface 120. In accord with the invention, one such downloaded application is the apparatus for the integrated three-tier application framework described herein.

The received code may be executed by processor 113 as it is received, and/or stored in mass storage 112, or other non-volatile storage for later execution. In this manner, computer 100 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

General Software Apparatus

An embodiment of the invention includes software apparatus comprising a collection of components configured to support an integrated three-tier architecture. The components may be implemented as one or more instances of object classes in accordance with known object-oriented programming practices, or the components may be implemented under one or more component model definitions. Several component model definitions are currently available, such as COM, CORBA, and the Java component scheme referred to as JavaBeans™.

Each component model provides for encapsulation of related functions and data structures into individual components, similar to what occurs under a standard object-oriented programming (OOP) approach. The particular mechanisms by which the components are managed and interact are defined according to the respective component model. Bridges (e.g., ActiveX) may be constructed which allow components designed under different component model definitions to interact within a single application. Interaction is typically performed through a set of methods implemented by the component. These sets of methods are referred to as "interfaces" in some component models. The public methods by which OOP object classes interact are often presented in the form of application programming interface (API) definitions.

To provide a better understanding of encapsulation of related data structures and methods, an overview of object-oriented programming is provided below.

Object-Oriented Programming

Object-oriented programming is a method of creating computer programs by combining certain fundamental building blocks, and creating relationships among and between the building blocks. The building blocks in object-oriented programming systems are called "objects." An object is a programming unit that groups together a data structure (one or more instance variables) and the operations (methods) that can use or affect that data. Thus, an object consists of data and one or more operations or procedures that can be performed on that data. The joining of data and operations into a unitary building block is called "encapsulation."

An object can be instructed to perform one of its methods when it receives a "message." A message is a command or instruction sent to the object to execute a certain method. A message consists of a method selection (e.g., method name) and a plurality of arguments. A message tells the receiving object what operations to perform.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are predominantly based on a "class" scheme. The class-based object-oriented programming scheme is generally described in Lieberman, "Using Prototypical Objects to Implement Shared Behavior in Object-Oriented Systems," OOPSLA 86 Proceedings, September 1986, pp. 214–223.

A class defines a type of object that typically includes both variables and methods for the class. An object class is used to create a particular instance of an object. An instance of an object class includes the variables and methods defined for the class. Multiple instances of the same class can be created from an object class. Each instance that is created from the object class is said to be of the same type or class.

To illustrate, an employee object class can include "name" and "salary" instance variables and a "set_salary" method. Instances of the employee object class can be created, or instantiated for each employee in an organization. Each object instance is said to be of type "employee." Each employee object instance includes "name" and "salary"

instance variables and the "set_salary" method. The values associated with the "name" and "salary" variables in each employee object instance contain the name and salary of an employee in the organization. A message can be sent to an employee's employee object instance to invoke the "set_salary" method to modify the employee's salary (i.e., the value associated with the "salary" variable in the employee's employee object).

A hierarchy of classes can be defined such that an object class definition has one or more subclasses. A subclass inherits its parent's (and grandparent's etc.) definition. The parent class is also referred to as a "superclass." Each subclass in the hierarchy may add to or modify the behavior specified by its parent class. Some object-oriented programming languages support multiple inheritance where a subclass may inherit a class definition from more than one parent class. Other programming languages, such as the Java programming language, support only single inheritance, where a subclass is limited to inheriting the class definition of only one parent class. The Java programming language also provides a mechanism known as an "interface" which comprises a set of constant and abstract method declarations. An object class can implement the abstract methods defined in an interface.

An object is a generic term that is used in the object-oriented programming environment to refer to a module that contains related code and variables. A software application can be written using an object-oriented programming language whereby the program's functionality is implemented using objects. As previously discussed, the encapsulation provided by objects in an object-oriented programming environment may be extended to the notion of components under a component model definition.

Implementation in the Java Programming Language

An embodiment of the software apparatus of the invention is implemented in the Java programming language. The Java programming language is an object-oriented programming language with each program comprising one or more object classes. Unlike many programming languages, in which a program is compiled into machine-dependent, executable program code, Java classes are compiled into machine independent bytecode class files. Each class contains code and data in a platform-independent format called the class file format. The computer system acting as the execution vehicle supports the Java runtime environment. The runtime environment contains a program called a virtual machine, which is responsible for executing the code in Java classes.

Applications may be designed as standalone Java applications, or as Java "applets" which are identified by an applet tag in an HTML document, and loaded by a browser application. The class files associated with an application or applet may be stored on the local computing system, or on a server accessible over a network. Each class is loaded into the Java runtime environment, as needed, by the "class loader."

Java classes are loaded on demand from the network (stored on a server), or from a local file system, when first referenced during an application or applet's execution. The runtime environment locates and loads each class file, parses the class file format, allocates memory for the class's various components, and links the class with other already loaded classes. This process makes the code in the class readily executable by the virtual machine.

Java classes may also be incorporated into Java components referred to as "JavaBeans". JavaBeans are designed in accordance with the JavaBean API Specification to allow for component-based application building. Bridges (e.g., ActiveX bridges) may be used with JavaBeans to allow JavaBeans to be used in other component model environments, such as OLE/COM and CORBA.

Support for features such as "introspection," "customization," "events," "properties" and "persistence" is provided within the JavaBean framework to facilitate application building and component use. "Introspection" permits builder tools to analyze how a particular bean works. "Customization" permits an application builder to customize the appearance and behavior of a bean. "Events" provide a simple communication metaphor that can be used to connect a bean with other application components or beans. "Properties" are used for bean customization and programmatic use. "Persistence" allows for a bean to have its customized state saved and reloaded later. These features are discussed in the JavaBean API Specification, Version 1.01, by Sun Microsystems (1997), which is available on the World Wide Web at the URL, "http://java.sun.com/beans/spec.html", and is incorporated herein by reference.

Embodiments of the software apparatus may be implemented using standard OOP object classes or using components under a known component model definition. For the purposes of the following description, references to components may refer to one or more instances of OOP object classes, or one or more components under a known component model.

Implementation of Three-Tier Framework

Figure 3:
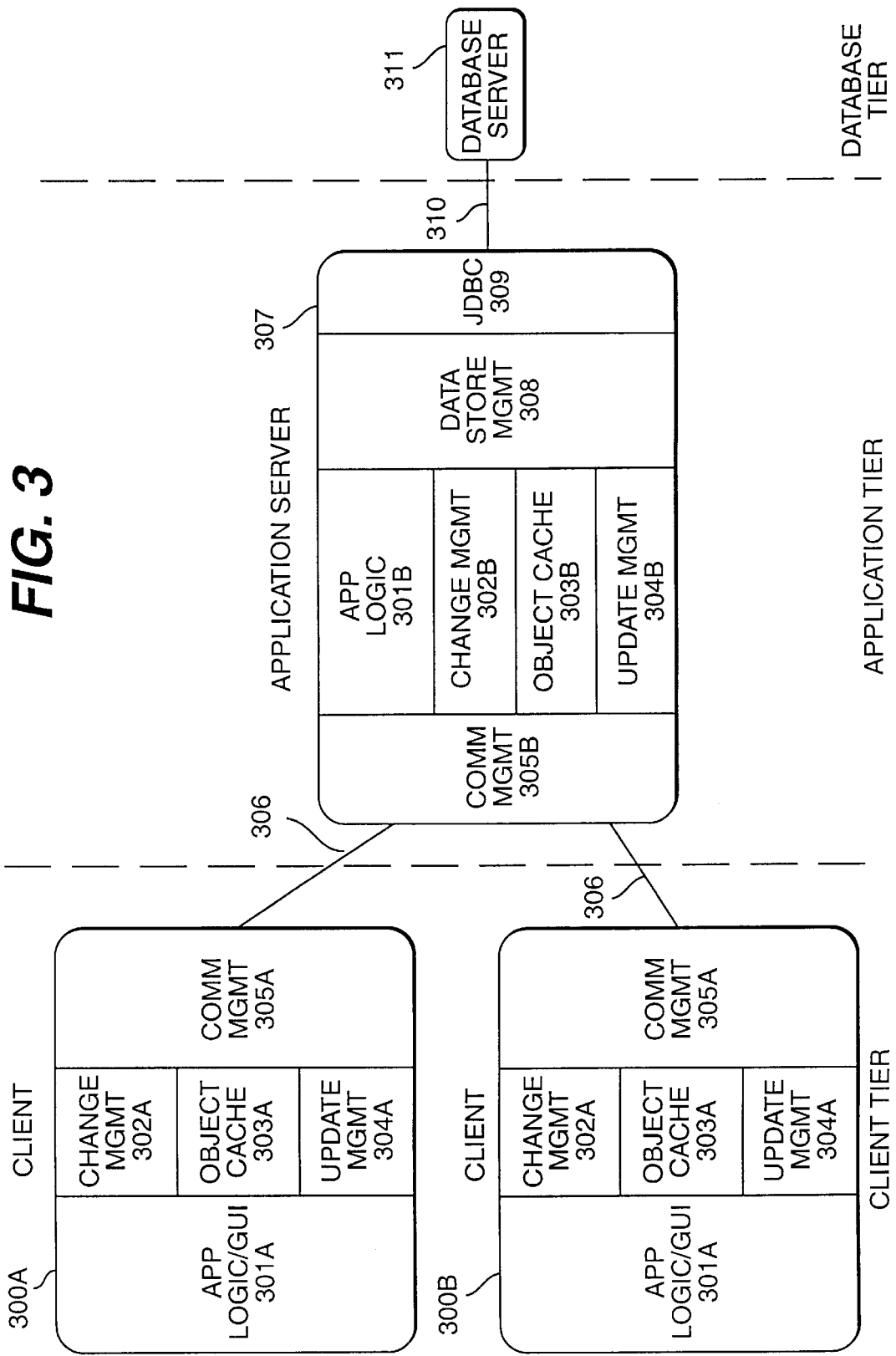
FIG. 3 is a block diagram of a three-tier application framework in accordance with an embodiment of the invention.

FIG. 3 is a block diagram of an implementation of a three-tier application framework in accordance with an embodiment of the invention. The three-tier application framework comprises one or more clients, such as clients 300A and 300B, in the client tier, application server 307 in the application tier and database server 311 in the database tier. As represented by lines 306, clients 300A and 300B are coupled to application server 307 to exchange method calls and data. As represented by line 310, application server 307 is coupled to database server 311 to exchange database calls and data. It is also possible in some embodiments for additional servers to be coupled to application server 307 for the exchange of enterprise data.

Within the client and application tiers, data is maintained in the form of data objects. Application server 307 maintains a set of objects containing data for the clients it serves. Clients 300A and 300B each maintain a subset of objects containing data for their respective user needs. Application server 307 is responsible for transforming data from the format of database server 311 into the form of data objects, and, similarly, from the form of data objects into the format of database server 311. Additionally, queries are transformed from a general query object format into the particular query format expected by database server 311, such as SQL.

Clients 300A and 300B comprise client-side application logic and graphic user interface (GUI) component 301A, client-side change management component 302A, client-side object cache component 303A, client-side update management component 304A, client-side communication management component 305A and client-side query management component 312A. Application server 307 comprises server-side communication management component 305B, server-side application logic 301B, server-side change management component 302B, server-side object cache component 303B, server-side update management component 304B, server-side query management component 312B, data store component 308 and database connectivity component 309 (e.g., a Java data base connectivity or JDBC™ component).

Client-Side Components

Client-side application logic and GUI component 301A provides the software mechanism by which the user is able to view the data and other output associated with a particular application, to generate input in the form of additions, deletions and modifications of data, and to otherwise exert control over the data and format of what is displayed. Client-side application logic and GUI component 301A interfaces with client-side change management component 302A, client-side object cache component 303A, client-side update management component 304A and client-side query management component 312A.

Client-side change management component 302A provides the software mechanism by which changes to data are handled within the respective client. This entails determining which objects within the client are affected by a change and carrying out the change on those objects. Also, the change is propagated to the application server for handling. In one embodiment, changes are abstracted into change objects. The change object, for example, may contain the state of a given data object before a change is applied, as well as the state of the given data object after the change is applied. Custom change objects for specific data classes may be subclassed from general framework change object superclasses. Client-side communication management component 305A is used to transmit a change object to application server 307, or to receive a change object from application server 307.

Client-side object cache component 303A maintains a set of objects for the respective client, as well as a hash table of the unique ID of each object thus maintained and an associated pointer to that object. When a user makes a request for data via client-side application logic and GUI component 301A, client-side object cache component 303A is first queried to determine whether the data object containing the desired data is already resident at the client. If the data object is resident, as indicated by the presence of its object ID in the hash table, client-side object cache component 303A returns to the requesting logic a pointer to the data object. If the object is not resident at the client, client-side cache component 303A sends a request for the given object to application server 307. When the desired object is transmitted from application server 307 to the requesting client, a pointer to the object is returned to the requesting application logic, and the object is registered in the hash table for future requests.

To maintain control over the number of data objects resident in the client, client-side cache component 303A may perform what is referred to as "pruning the cache." This means that certain data objects are removed from client-side cache component 303A by removing their entries in the hash table. Data objects whose entries have been removed from the hash table may then be garbage collected by the system.

Reference counting may be used to determine which objects are currently in demand, or more advanced interest registries may be used for such a purpose. In reference counting, a reference count value associated with a given cache object is incremented whenever another referencing object obtains a reference to the cache object. The reference count value is decremented whenever a referencing object indicates the reference to the cache object is no longer needed. When the reference count is at zero, no other objects maintain a reference to the cache object, and it may be safely removed from the object cache and garbage collected.

With a more advanced interest registry, interest objects may be used to indicate that one or more objects are "interested" in actions involving a particular data object in the cache (i.e., a cache object). These interest objects can thus be used to determine which cache objects are subject to registered interest and which are not. Those cache objects for which no interest objects are registered may be safely removed from the object cache.

Client-side query management component 312A provides a mechanism for formulating application queries, and, either resolving those queries against client-side object cache 303A, or forwarding those queries to application server 307 for handling. Object requests or queries from application logic are typically encapsulated within one or more query objects. If a query object contains only object IDs, the query object may be resolved against the object cache. If a query object contains query information other than object IDs, the query object is transmitted to application server 307 to be resolved into an appropriate database query for the database server. Responses to the database query are encapsulated into one or more data objects and returned to the requester. The hash tables of the respective object cache components are updated to include the new data objects.

Custom query objects with application specific semantics may be subclassed from general framework query object superclasses. Further, query object subclasses may extend interest-based object superclasses that implement active updating through registration of interest objects that identify the query requester with the data objects resulting from the query.

Client-side update management 304A provides the software mechanism by which updates are applied to data objects and other associated objects within the respective client. For example, in one embodiment, client-side update management component 304A implements an active updating scheme. This means that not only is a data object affected by changes in the form of an addition, deletion or modification of associated data, those objects in client-side application logic and GUI component 301A that are dependent on the associated data are also updated. This is opposed to a passive update scheme wherein objects in client-side application logic and GUI component 301A would not be aware of changes to data until and unless a further reference is made to the respective data object, at which time the data object would determine whether an update is necessary.

One method for implementing the active updating scheme is to apply interest objects as discussed briefly above. Query objects result in the registration of an interest object for the requester. Any changes to data objects passed as a result of the query will be propagated to the interested component indicated in the registered interest object. Further description of the interest scheme is provided in copending U.S. patent application Ser. No. 09/092,356, entitled "Method and Apparatus of Performing Active Update Notification," filed on Jun. 5, 1998, assigned to the same assignee, and incorporated herein by reference.

Client-side communication management component 305A provides the software mechanism by which objects and method calls are transmitted between the client (300A or 300B) and application server 307. In accordance with an embodiment of the invention, objects that may be transmitted between the client and application tiers are configured with metadata describing the elements of the object, such as the attribute names and types, methods, etc. Objects configured with metadata can be serialized, that is, broken down into a set of data bytes containing the metadata descriptions and object state which may later be reconstituted (i.e., "deserialized") by the same or a different application to generate a copy of the original object.

Serialization provides a useful mechanism for object persistence and transmission. With respect to persistence, a serialized object may be stored in memory for any length of time and regenerated with the same state the object had at the time it was serialized. With respect to object transmission, a serialized object may be transmitted between remote clients and servers as data streams or packets in accordance with known communication protocols, such as the protocol implemented by the Remote Method Invocator (RMI) API. Also, serialized objects may be written to a shared portion of memory by one application and read out of the shared memory by another application. Client-side and server-side communication management components 305A and 305B implement methods to perform serialization and deserialization functions. Data transport, such as the transmission and reception of serialized objects, may be implemented using any known communication protocol as described above.

Server-Side Components

Server-side communication management component 305B performs the same general functions for application server 307 as its counterpart component 305A does for client 300A or 300B, such as serialization, deserialization, and data transport. Method calls and objects received by the server-side communication management component from client-side communication management component 305A are directed to server-side components 301B, 302B, 303B, 304B and 312B as specified by the call either explicitly or implicitly. Method calls or objects destined for the client tier are directed to the client-side communication management component 305A of the specified client, 300A or 300B.

Server-side application logic 301B provides any application-specific functions for application server 307, such as data analysis and processing algorithms, etc. Further, automated data functions, such as time-based operations, and multi-client oriented operations may be implemented by server-side application logic 301B. These functions may also include the implementation of a permissions model for determining access permissions and change permissions for different clients or users. The division of application-specific functionality between client-side application logic and GUI component 301A and server-side application logic 301B may be determined by the relative efficiency of shared functions on a server versus local functions on a client. Also, the use of a thin client or thick client topology may determine how functions are divided between clients 300A and 300B and application server 307.

Server-side change management component 302B provides for the application of changes, for example, in the form of change objects, to data objects in application server 307. Change objects may be received from either of clients 300A or 300B (or from other servers). The changes embedded within change objects are used by datastore management component 308 to send appropriate calls to database server 311 to manipulate the persistent data stored therein. In one embodiment, as part of a change operation, a call may be made to one or more permissions objects in the application logic component 301B, to determine whether the encapsulated change is allowed. The change may then be undone at the client if the change is not permissible, or the change may be carried out on the application server and propagated to the database if the change is permissible.

In one embodiment, changes are handled within a transactional scheme. Change objects allow several benefits in a transactional scheme. For example, change objects may be stored on a stack after the associated changes have been performed. The stack of change objects may then be used to perform transaction rollbacks, that is, the change objects may be used to "undo" or reverse the changes previously performed. "Redo" functions are also easily implemented. In one embodiment, change objects may be collected on a client while the client is offline from an application server. When the client is once again connected to the application server, the change objects may be applied to the application server.

Server-side object cache component 303B is similar to the client-side object cache component 303A. When a data object request or query object is received from a client or from the server-side application logic 301B, the request is resolved against the cache, if possible, by specifying the object ID in the hash table. If a data object is already registered with the object cache component 303B, a pointer to that object is returned. If the object is not registered with object cache component 303B, datastore management component 308 is utilized to obtain the desired object or objects from the persistent store of database server 311. The newly obtained data object is registered with object cache component 303B, and the pointer to the data object is returned to the query sender.

Server-side update management component 304B acts in association with change management component 302B to ensure that notices regarding changes to data are transmitted to all interested elements of the system. Under the active notification scheme using interest objects, update management component 304B maintains a registry of clients and other servers that wish to be notified when a designated data object is changed. When a change is made, interested elements within application server 307 and interested clients receive notification of the change. Notification within each client is typically resolved by the respective client-side update management component 304A.

Server-side query management component 312B receives query objects from the client tier, from other application servers, or from components of application server 307. Query objects thus obtained are resolved against server-side object cache 303B if only object IDs are specified by the query. If the query object cannot be resolved against object cache 303B, either because the requested objects IDs are not in the hash table or because the query is not in the form of object IDs, query management component 312B passes the query object to datastore management component 308 to be processed.

Datastore management component 308 responds to calls from the server-side change management component 302B by making API calls to JDBC component 309 to create, delete or mutate persistent data within database server 311. Datastore management component also responds to query objects by submitting database requests to the database server. The results of the database requests are then encapsulated into one or more corresponding data objects. If a data object resulting from a query is already in the server-side object cache component 303B, the cached data object is returned. If the data object is not in server-side object cache component 303B, a new data object is obtained, via factory method calls directed to a data class factory object, to encapsulate the data. Typically, the factory method calls result in the instantiation of a desired data object class. However, in other embodiments, the new data object may be obtained from a pool of available data object instances. The new data objects are assigned ID numbers, loaded with appropriate data from database server 311, and returned.

Datastore management component 308 performs the conversion from queries encapsulated in query objects to corresponding database calls by resolving the queries with database tables. The JDBC component 309 provides the conversion between general database calls made by datastore management component 308 and database-specific commands (e.g., SQL) and communication protocol required by the particular implementation of database server 311 (e.g., Oracle, Sybase, etc.). Connection 310 represents the communication link between JDBC component 309 and database server 311. In some embodiments, other database connectivity components may be used in place of or in addition to JDBC component 309.

Database server 311 may be any form of structured persistent store. For example, database server 311 may comprise a flat-file data management system, a relational database management system (RDBMS), an object-oriented database management system (ODBMS), etc. Typically, the organization of the database may be represented by one or more database tables wherein each column of the table represents a particular data attribute having a specified database type. Each row represents a set of attribute values associated with a particular index. In one embodiment, each row of a database table is associated with a particular data object, and each table is associated with a data object class. Each column therefore specifies an attribute of the given data object class. In other embodiments, the database organization may be independent of the data object classes in the client and application tiers. The datastore management component 308 handles mapping of the data objects to the database. In accordance with an embodiment of the invention, the database tables are generated during, or prior to, system start-up from schema information.

Figure 8:
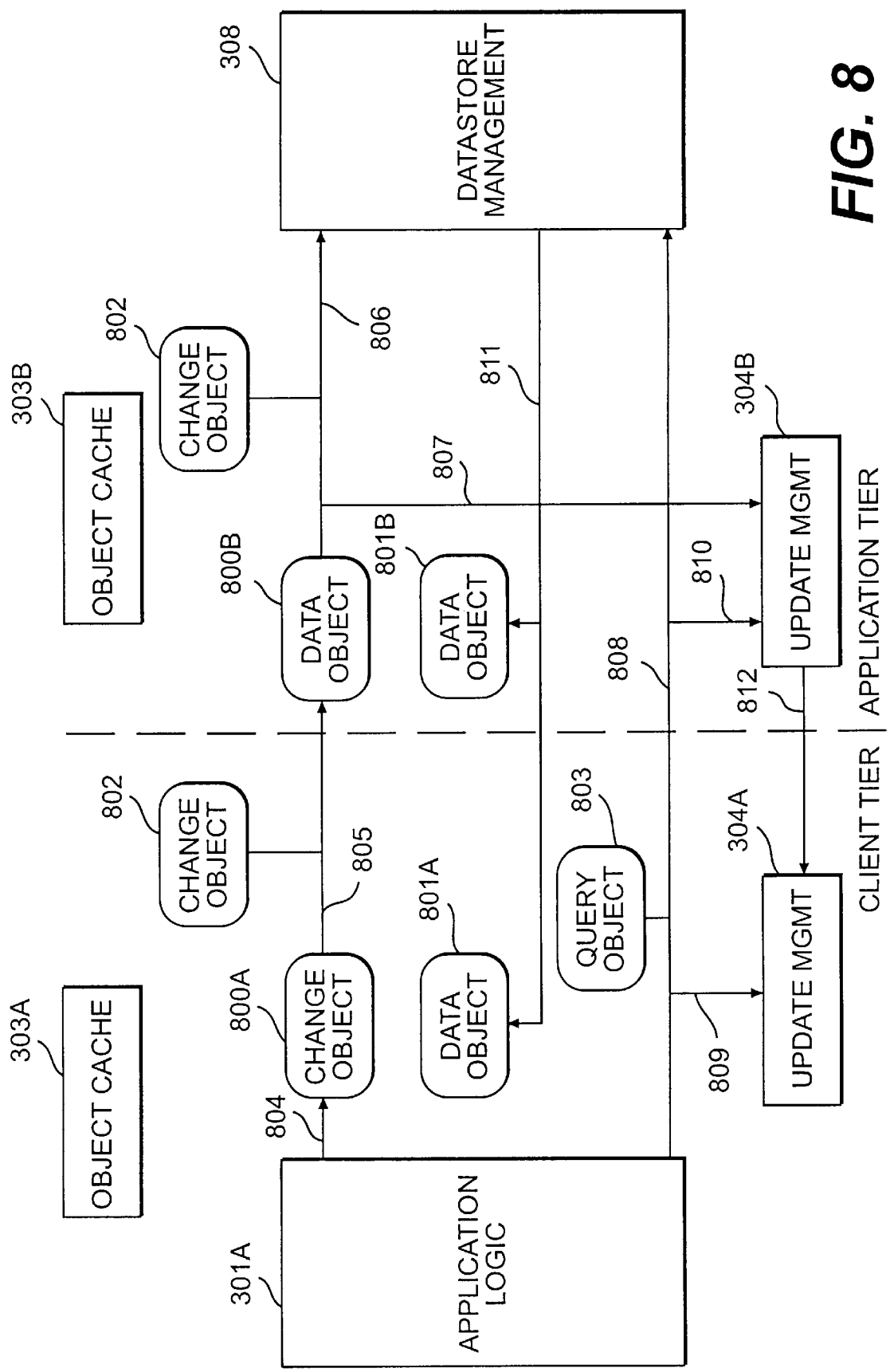
FIG. 8 is a block diagram illustrating the use of data objects, change objects and query objects, in accordance with one embodiment of the invention.

FIG. 8 illustrates the use of data objects, change objects and query objects in the client and application tiers in accordance with one embodiment of the invention. The client tier comprises application logic 301A, object cache 303A, and update management component 304A. The application tier comprises object cache 303B, datastore management component 308 and update management component 304B. In addition, data objects 800A and 800B reside in object cache 303A and object cache 303B, respectively.

When application logic makes a change to data object 800A, as indicated by arrow 804, a transaction is initiated that includes the creation of a change object and the propagation of that change object to the database. Change object 802 is transmitted to the application tier, as indicated by arrow 805, where change object 802 is applied to corresponding data object 800B. Changed data object 808 is then applied to the database through datastore management component 308, as indicated by arrow 806.

As one of the steps in the change transaction, update management component 304B is informed of the change, as indicated by arrow 807. Interested clients are identified by update management component 304B, and a notice of the change is transmitted to the update management component 304A of the interested clients, as indicated by arrow 812. The client update management component 304A then determines, based on an interest registry, which elements on the client should receive notification of the change. The data objects in object cache 303A are typically updated at the time the client is notified of the change.

When application logic 301A makes a database query that cannot be resolved directly by an object cache, the query is transmitted, as shown by arrow 808, to datastore management component 308 in the form of query object 803. Transmission of query object 803 is performed under management of client-side and server-side query management components (not shown). In response to the query, datastore management component 308 returns, as shown by arrow 811, corresponding data objects 801A and 801B which are registered with the client-side object cache 303A and server-side object cache 303B, respectively. As part of the query process, interest in data objects 801A and 801B is registered with update management components 304A and 304B, as shown by arrows 809 and 810, respectively.

Figure 9:
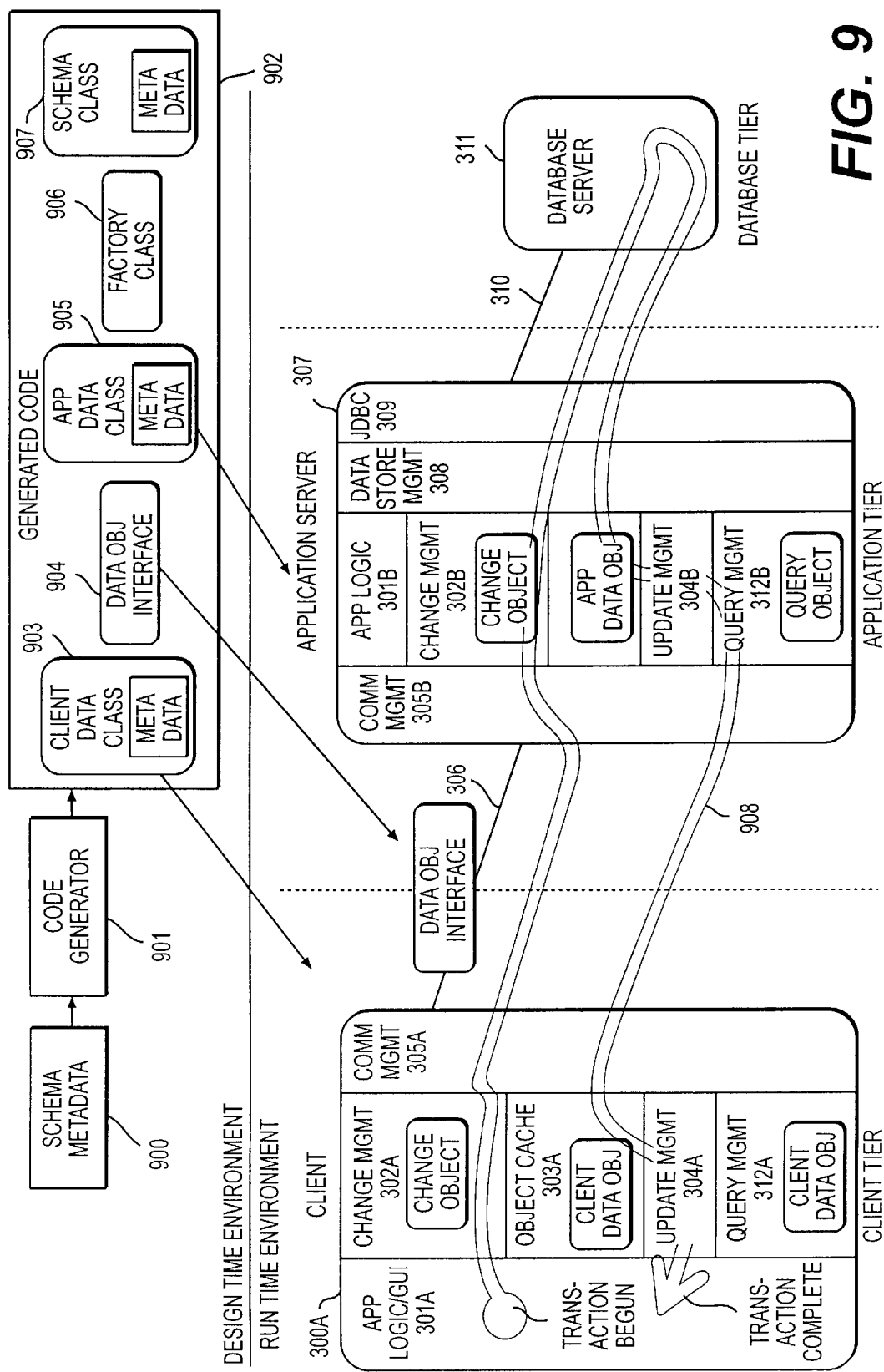
FIG. 9 is a block diagram of design time and run time environments in accordance with an embodiment of the invention.

FIG. 9 illustrates relationships between the design time and run time environments of an embodiment of the invention. The design time environment is associated with the generation of class definitions for one or more data classes, a factory class and a schema class, based on application-specific schema metadata. The run time environment is associated with the execution of the three-tier application (as illustrated in FIGS. 3 and 8) in which instances of the classes generated in the design time environment are integrated with the components of the three-tier application. For example, data objects in the run time environment are created as instances of the data glasses generated in the design time environment. An instance of the generated factory class is used in the run time environment to obtain the data object instances. Also, an instance of the generated schema class is used in the run time environment to structure the database at initial start-up, and to provide a facility for accessing schema metadata at run time.

As shown, the design time environment comprises schema metadata 900, code generator 901, and generated code 902. Generated code 902 further comprises client data class 903, data object interface 904, application (i.e., server) data class 905, factory class 906 and schema class 907. In accordance with an embodiment of the invention, one client data class 903, one data object interface 904 and one application data class 905 are generated for each data class described by schema metadata 900. Data classes 903 and 905 include metadata describing the attributes and methods, for example, of the respective class. Schema class 907 includes metadata describing the data management of the system in terms of metaclasses and their constituent elements. The processes of code generation in the design time environment are described in further detail in following sections of this specification.

The run time environment comprises the components of the client, application and database tiers as earlier described with respect to FIG. 3. For example, the client tier comprises one or more clients (300A) having application logic and GUI component 301A, change management component 302A, object cache component 303A, update management component 304A, query management component 312A and communication management component 305A. The application tier comprises one or more application servers (307) having communication management component 305B, application logic 301B, change management component 302B, object cache component 303B, update management component 304B, query management component 312B, datastore management component 308 and JDBC component 309. The database tier comprises one or more database servers (311). The client and application tiers are joined by connection 306, and the application and database tiers are joined by connection 310.

As shown, handling of change objects, such as change application and forwarding operations, is performed by change management components 302A and 302B at the client and server tiers. Query management components 312A and 312B at the client and server tiers handle query object operations, such as resolving queries against a respective object cache or forwarding to another tier or to the data store component for handling. Object cache components 303A and 303B manage data objects for client 300A and application server 307, respectively. As suggested above, the client data objects are obtained for object cache component 303A in the form of instances of client data classes 903 generated in the design time environment. Similarly, application data objects in object cache component 303B are obtained in the form of instances of application data classes 905. Corresponding data objects in the client and application tiers implement the same shared data object interface 904 generated in the design time environment.

In FIG. 9, arrow 908 is used to illustrate the propagation of a change transaction through the three-tier system. The transaction begins in application logic and GUI component 301A, when the application logic initiates a change to a data object, for example, by calling one of the data object's attribute "set" accessor methods. In response to the method call, the data object calls change management component 302A, where a corresponding change object is obtained. Change management component 302A adds the change object to a list of change objects associated with a single transaction. Other change objects may be added to the list before the transaction is closed, for example, due to receipt of an "end of transaction" call.

When the transaction is closed, change management component 302A provides the list of change objects to communication management component 305A. Communication management component 305A serializes and transmits the list of change objects to communication management component 305B at application server 307. Communication management component 305B deserializes the list of change objects and provides them to change management component 302B. Change management component 302B then applies the list of change objects to the application data objects in object cache component 303B. The updated data objects in object cache component 303B are passed to data store management component 308. Datastore management component 308, in association with JDBC component 309, converts the updated data objects into database calls (e.g., SQL calls) to database server 311 to update the database records corresponding to the updated data objects.

If the transaction fails at the database server, change management component 302B uses the list of change objects to "undo" the changes made to the data objects in object cache component 303B and sends notification to client 300A that the transaction failed to commit. If the datastore management component 308 receives confirmation of a successful update from the database server, update management component 304B is notified of the updated data objects in object cache component 303B. Update management component notifies all interested components on application server 307, and sends update notifications to all other interested servers and interested clients.

The update notification to the client includes the updated data objects. Communication management component 305B serializes the data objects and transmits them to communication management component 305A. Communication management component 305A extracts the object IDs from the serial stream and determines whether those data objects exist in object cache 303A. If a data object already exists, the values of the data object are updated with the values of the corresponding serialized data object. If a data object does not exist in the object cache, a new data object instance is placed in object cache component 303A and loaded with the values of the corresponding serialized data object.

Once updated data objects have been established in object cache component 303A, update management component 304A is notified of the updated data objects in the object cache. Update management component 304A proceeds to notify all interested components of client 300A of the updated data objects. The transaction is completed when the initiating element of application logic and GUI component 301A receives notification of the changed data objects.

In another embodiment, the change objects may be applied to the data objects in object cache component 303A at the time an "end of transaction" is signalled. In this case, object cache component 303A would not need updating just prior to notifying update management component 304A of the updated data objects. However, any "undo" operation would include undoing data object changes in object cache component 303A.

Use of Schema and Embodiment of Metadata Structures

In accordance with one embodiment of the invention, metadata is associated with each data object class. The metadata describes the elements of each data class in terms of, for example, attribute and method names, parameters, data types, inter-class relationships, etc. The "schema" is a description of the three-tier system, and comprises the metadata for all of the data classes associated with the system. The schema is utilized in the design time environment (i.e., during the building stage of development) to automate production of data class definitions for the client and application tiers, and to automate production of a factory class for instantiating those data classes. Redundant programming is therefore reduced. Further, data class definitions generated in this manner can be easily configured with interfaces that conform to expected data object specifications for integration with other components of the three-tier system.

A schema object may be generated that contains the schema metadata for informational access by components of the three-tier system. Components may access the metadata in instances of these metaclasses at runtime to determine the attributes that make up the associated data class and the methods for interfacing with that data class.

The schema is also utilized to create the database tables that are used to organize the database. By extracting the attribute names and associated data types for persistent data in each data class, as defined in the schema metadata, commands, such as SQL "create table" commands, can be generated and used by the datastore component to structure the database at start-up.

Figure 4:
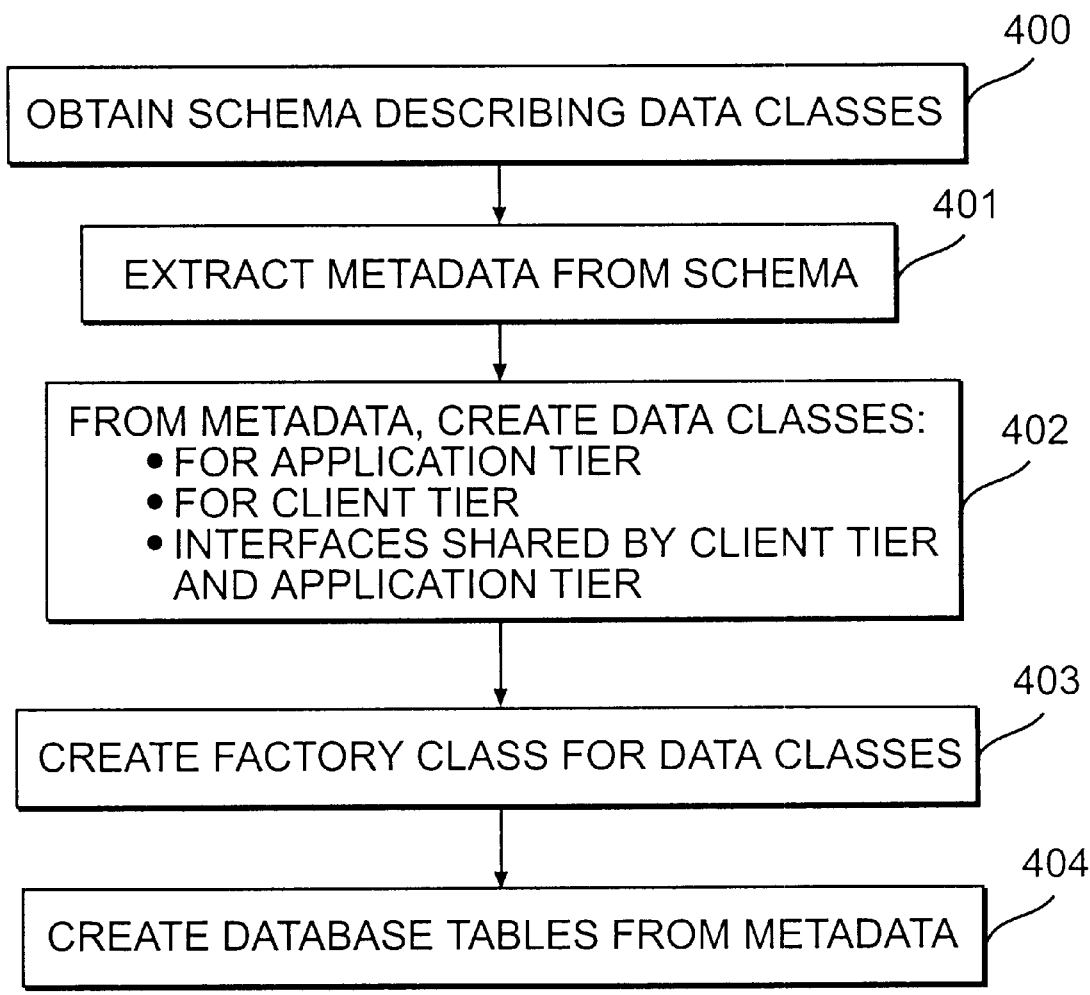
FIG. 4 is a flow diagram of a process for generating classes and database tables in accordance with an embodiment of the invention.

FIG. 4 is a flow diagram illustrating a process for utilizing system schema to build a three-tier application with automated code generation in accordance with an embodiment of the invention. In step 400, the schema describing the data classes to be used in the system is obtained. In step 401, the metadata for the data classes is extracted from the schema. The metadata thus extracted is used, in step 402, to create data class definitions (e.g., ".java" files) for the application tier and the client tier. The actual implementation for the different tiers may differ, but the attributes and method calls are the same. For each class, an interface definition specifying the common method interface for the application and client tiers may also be created. In step 403, a factory class is created that provides one or more factory methods for obtaining instances of the data classes described by the metadata. In step 404, database tables are created from the schema metadata by formulating "create table" commands from the class and attribute descriptions within the metadata. It will be obvious that steps 402 and 403 may be performed in any desired order. Step 404 is typically performed at run time during initial start-up.

The schema may be provided as a text file listing the different elements of each data class with known delimiters between each element or portion of elements. An example of a text file schema for a data class is provided below. The individualized schema entries are shown within "< >" symbols. Optional entries are shown inside of parentheses.

```
CLASS <classname> (ABSTRACT) (INTERFACE) (PERSISTENT)
(VERSION/"<versioninfo>") (SUPER/<superclassname>)
(INTER/<intefacename>) {
    IMPORTS {
        <importstring>,
        <importstring>,
    }
```

-continued

```
    ATTRIBUTES {
        <attributename> <datatype> (DEFAULT/<defaultvalue>),
        <attributename> <datatype> (DEFAULT/<defaultvalue>)
    }
    METHODS {
        <methodname> <datatype> (COMMENT/"<commentstring>")
        (THROW/<exceptionname>) (PRIVATE/<privateflagvalue>) {
            (PARAMETERS {
                <parametername> <datatype>,
                <parametername> <datatype>
            })
            (BODY {
                "<methodstring>",
                "<methodstring>"
            })
        }
        <methodname> <datatype> (COMMENT/"commentstring")
        (THROW/<exceptionname>) (PRIVATE/<privateflagvalue>) {
            (PARAMETERS {
                ...
            })
            (BODY {
                ...
            })
        }
    }
}
```

A parsing program may be used to extract the schema metadata from the above text file. The metadata thus extracted may, for example, be stored in metadata structures and applied to class and table generation processes within a generator mechanism. The above text schema format may be expanded to include other metadata entries not illustrated in the example, such as constants or relationships with other classes.

The schema may also be provided in a coded format where the schema file is implemented as a series of commands or method calls with the schema data provided as command or method parameters. For example, methods such as newClass( ), newAttribute( ), newMethod( ) and newParameter( ) could be used to specify the entry of the corresponding element. Those methods may then be defined to facilitate the setting of metadata attribute values and flags in metadata structures. By compiling the schema file and executing the method calls, the schema metadata may be extracted and loaded directly into the desired data structures, with the desired flags automatically set in accordance with the specified methods. An example of a coded schema file for a sample class is provided below. The individualized schema entries are shown within "< >" symbols.

```
newClass = newCoreClass("<classname>", <superclass>);                                    (1)
    newClass.setClassVersion("<versioninfo>");                                           (2)
    addImport("<importstring>");                                                         (3)
    newAttribute( ).private( ).persistent( ).nonNull( ).string_( ).name("<attribut      (4)
ename>");
    newAttribute( ).private( ).persistent( ).nonNull( ).object_("<classname>").n        (5)
ame("attributename>");
    newMethod( ).public_( ).object_("<classname>").name("<methodname>");                 (6)
        newParameter( ).object_("<classname>").name("<parametername>");                  (7)
        newParameter( ).int_( ).name("<parametername>");                                 (8)
        addBody("<methodstring>");                                                       (9)
        addBody("<methodstring>");                                                      (10)
```

Line (1) obtains a new metaclass instance and assigns class name and superclass values to metaattributes within a new metaclass. Line (2) sets the value of a class version metaattribute in the new metaclass to <versioninfo>. Line (3) writes a string containing import information into an import data structure such as a Vector. A "Vector" is a data type of the Java programming language that comprises an array of elements that may be of any data type and of any length. Data types other than the Vector data type may also be used to store metadata.

Line (4) establishes a new metaattribute within the metaclass to describe an attribute within the current class. Boolean flags within the metaattribute are set to specify that the attribute is private, persistent and non-null. The attribute is a string data type with the name <attributename>.

The sequence of method calls coupled by "." is typically evaluated from left to right. Each method call returns an object that acts as the implementor of the next method call in the sequence. For example, in line (4), the method call newAttribute( ) returns a metaattribute instance. The private( ) method of the metaattribute instance is then called which sets a private flag of the metaattribute and returns the metaattribute for the next method call. The persistent( ) method similarly sets a persistent flag of the metaattribute and returns the metaattribute, and likewise with the nonNull( ) method. The string_( ) method associates a metadatatype of type string with the current metaattribute and returns the metaattribute. The name( ) method sets a name string in the metaattribute to the value of "attributename".

In line (5), a second metaattribute is established to describe a second attribute. Again, flags are set to specify that the attribute is private, persistent and non-null. The data type specified within the metaattribute is an object data type of the class <classname>. The name of the attribute is <attributename>.

Line (6) establishes a metamethod to describe a method of the current class. A flag is set to specify that the class is public. The method returns an object data type of class <classname>, and the methods name is <methodname>. In lines (7) and (8), metaparameters are associated with the metamethod of line (6). Line (7) specifies an object data type parameter of class <classname>, and having a parameter name of <parametername>. Line (8) specifies an integer data type parameter having a parameter name of <parametername>. Lines (9) and (10) write individual lines of the method to a method body data structure (such as a Vector) as data strings.

In the schema examples above, standard methods such as constructors and accessors are not required to be specified. Those standard methods are automatically generated in a standardized manner when class definitions are created from the metadata. Further, reflection methods, whereby other objects are able to access the attributes of an object by specifying an attribute ID to a general method, may also be automatically generated for each class.

Simple method calls or flag indicators similar to those shown above may be added to the schema description to trigger the automatic generation of other standardized methods. For example, certain classes may wish to instantiate other classes to fill an object data type attribute. In this instance, for example, an offerNewMethod ( ) call may be added to the attribute command sequence to specify the automatic creation of "New" methods during class generation. These "New" methods may use a standard "try-catch" method format to "try" to obtain a new instance of a data class from a class factory, and to "catch" any exception generated by a failure to obtain the desired class instance.

Figure 5A:
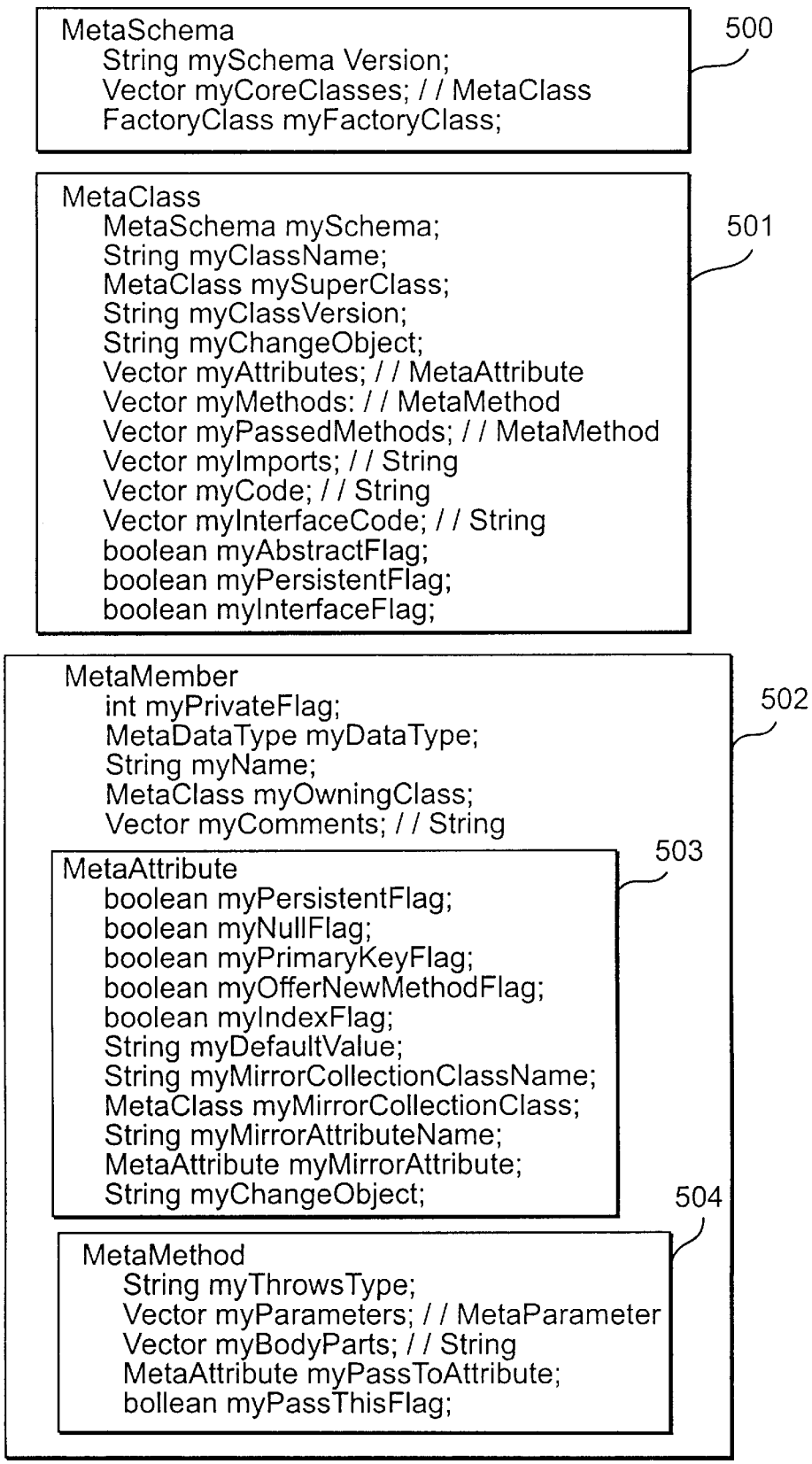

FIGS. 5A and 5B illustrate embodiments of metadata structures for storing metadata in accordance with an embodiment of the invention. FIG. 5A comprises MetaSchema 500, MetaClass 501, MetaMember 502, MetaAttribute 503 and MetaMethod 504. FIG. 5B comprises MetaParameter 505 and MetaDataType 506. One or more values within the metadata structures may be null, depending upon the class or class element being described by the metadata structures.

MetaSchema 500 comprises a string data structure, "mySchemaVersion," that stores schema version information such as a version date. Also, MetaSchema 500 comprises a Vector data structure, "myCoreClasses," containing the set of MetaClasses describing the data classes of the system. Further Vector structures may be defined for metaclasses associated with other system classes aside from data classes, and for the entire set of system classes including data classes and non-data classes (i.e., those classes associated with system components 302A–305A, 302B–305B and 306–308). A reference ("myFactoryClass") to the generated factory class is also contained within MetaSchema 500.

MetaClass 501 comprises a reference, "mySchema," to its associated MetaSchema, and a reference, "mySuperClass," to the MetaClass instance describing the superclass of the current class. String data structures, "myClassName," "myClassVersion" and "myChangeObject," store the name of the class, the version of the class and the name of the class's change object, respectively. Boolean flags, "myAbstractFlag," "myPersistentFlag" and "myInterfaceFlag," indicate whether the described class is abstract, persistent and/or an interface, respectively.

The embodiment of MetaClass 501 shown comprises six Vector data structures: "myAttributes," "myMethods," "myImports," "myCode," "myInterfaceCode" and "myPassedMethods." "myAttributes" is a Vector of MetaAttribute instances describing the attributes of the current class. Similarly, "myMethods" is a Vector of MetaMethod instances describing the methods of the current class. "myImports" is a Vector of string instances containing class filenames for import into the current class. "myCode" is a Vector of string instances describing the lines of programming code for inclusion in the current class. "myInterfaceCode" is a Vector of string instances describing lines of programming code for inclusion in an interface for the current class. "myPassedMethods" is a Vector of MetaMethod instances passed by other MetaClasses to the current MetaClass instance. A "passed method" refers to the case where an originating class contains a method that invokes a similarly named method of a subsequent class in which the desired method steps are implemented. The originating class is said to "pass" the method to the subsequent class.

MetaMember 502 is, in this embodiment, a superclass of MetaAttribute 503 and MetaMethod 504. Thus, the attributes of MetaMember 502 are included in MetaAttribute 503 and MetaMethod 504 by extension, as are those methods of the superclass not overridden by the subclasses. In other embodiments, the elements of the MetaMember class may be explicitly defined for MetaAttribute 503 and MetaMethod 504 without the use of a MetaMember superclass.

MetaMember 502 comprises an integer data structure containing "myPrivateFlag." "myPrivateFlag" describes the private and protected state of the class element described by MetaMember 502. A reference, "myDataType," is stored to a MetaDataType instance describing characteristics of the data type associated with the current class element. A string structure, "myName," contains the name of the element as a character string. A reference, "myOwningClass," refers to the MetaClass instance describing the class of which the current element is a part. Also, a Vector of string data structures, "myComment," is maintained which stores, as character strings, lines of comments to be associated with the current element.

MetaAttribute 503 comprises boolean structures "myPersistentFlag," "myNullFlag," "myOfferNewMethodFlag," "myPrimaryKeyFlag" and "myIndexFlag." "myPersistentFlag" indicates whether the current attribute is persistent, requiring storage in the database. "myNullFlag" specifies whether the current attribute is allowed to have a null value. "myOfferNew-MethodFlag" specifies whether a "New" method is to be generated for obtaining a new instance of the current attribute's data type from, for example, a class factory. "myPrimaryKeyFlag" specifies during database table generation that the current attribute is a primary key for the table. "myIndexFlag" may also be used during database table generation.

MetaAttribute 503 further comprises the following string data structures: "myDefaultValue" specifying a default attribute value as a character string, "myMirrorCollectionClassName" specifying the class name of the elements contained in the Vector represented by the current attribute (if applicable), "myMirrorAttributeName" specifying the name of a mirror attribute in each element of the Vector represented by the current attribute (if applicable), and "myChangeObject" specifying the name of the change object class associated with the attribute. A reference, "myMirrorCollectionClass," refers to the MetaClass instance describing the associated mirror collection element class. Also, a reference, "myMirrorAttribute," refers to the MetaAttribute instance describing the associated mirror attribute.

A mirror collection refers to a collection or set of elements where those elements are instances of a class (i.e., the "mirror collection class"). Each class instance within the mirror collection may contain an attribute (i.e., the "mirror attribute") that is a reference to an owning class of the mirror collection. For example, a scheduling application may include an appointment class to represent meetings and an invitation class to represent an individual invited to attend a given appointment. Each appointment instance may contain a collection (e.g., an "invitations" Vector) of invitation instances representing the individuals invited to the given appointment. The invitation instances, in turn, contain a reference (i.e, a "mirror attribute") to the appointment instance containing the "invitations" Vector of which they are a part. In accordance with an embodiment of the invention, respective MetaClass instances are used to describe the appointment class and the invitation class. Further, a "mirror collection" MetaAttribute instance within the appointment MetaClass instance is used to describe the invitations Vector. A "mirror attribute" MetaAttribute instance within the invitation MetaClass instance refers to the appointment MetaClass instance.

MetaMethod 504 comprises a string structure, "myThrowsType," that specifies the exception type, if any, thrown by the current method being described. MetaMethod 504 comprises two Vector data structures, "myParameters" and "myBodyParts." "myParameters" is a Vector of Meta-Parameter instances describing the individual parameters of the current method. "myBodyParts" is a Vector of string structures for storing lines of method code as individual character strings. A reference, "myPassToAttribute," refers to the MetaAttribute instance describing an attribute to forward the method call to, if applicable. A boolean structure, "myPassThisFlag," specifies whether to include "this" as a parameter in a forwarded method.

MetaParameter 505 comprises a string structure, "myName," specifying the parameter name as a character string. MetaParameter 505 further comprises a reference, "myDataType," to a MetaDataType instance describing the data type of the parameter.

MetaDataType 506 comprises a Vector of MetaDataType instances labeled "ourTypes." The MetaDataType class has a method for populating "ourTypes" with a number of MetaDataType instances with stored metadata corresponding to different data types. "ourTypes" may be used as a library of information on data types, with methods for accessing a specific MetaDataType instance by token value.

The integer data structure, "myToken," stores the token value assigned to a given MetaDataType instance. A string data structure, "myTokenName," stores the character string representing the token name assigned to the given MetaDataType instance. String structure "myJavaDeclaration" specifies a character string for declaring, in the Java programming language, the data type described by the MetaDataType instance. The string structure, "myJavaInterfaceDeclaration," specifies a similar character string for declaring the current data type if the data type is an interface type. Other programming language declarations could be similarly represented, either alternatively or additionally. String structures "myDatabaseDeclaration" and "myDatabaseLength" are used in the construction of database tables. "myDatabaseDeclaration" specifies the character string for the database data type, and "myDatabaseLength" specifies the character string for the length of the data type in the database.

MetaDataType 506 further comprises a reference, "myReferenceType," to a MetaClass Instance, if the MetaDataType instance corresponds to an object class described by a MetaClass. String structure "myObjectifier" specifies an objectifier for the MetaDataType instance, whereas string structure "myDeobjectifier" specifies a deobjectifier. Objectifiers and deobjectifiers are used respectively to convert certain non-class data types into corresponding class data types, and to convert class data types into non-class data types. For example, an objectifier may be used to convert an integer variable into an Integer class instance containing the integer variable value, as well as certain methods for operating on the integer variable value. Boolean structure "myPassByCopyFlag" whether the represented data type is passed directly, or whether the data type is first duplicated with the copy being passed. String structure "myCollectionContentName" specifies, for a data type containing a collection of objects, what the class name is for the elements in the collection. String structure "myNullValueString" stores the null value for the current data type. Examples of null values include "null", "−1", etc.

Generation of Classes and Common Interface

Figure 6A:
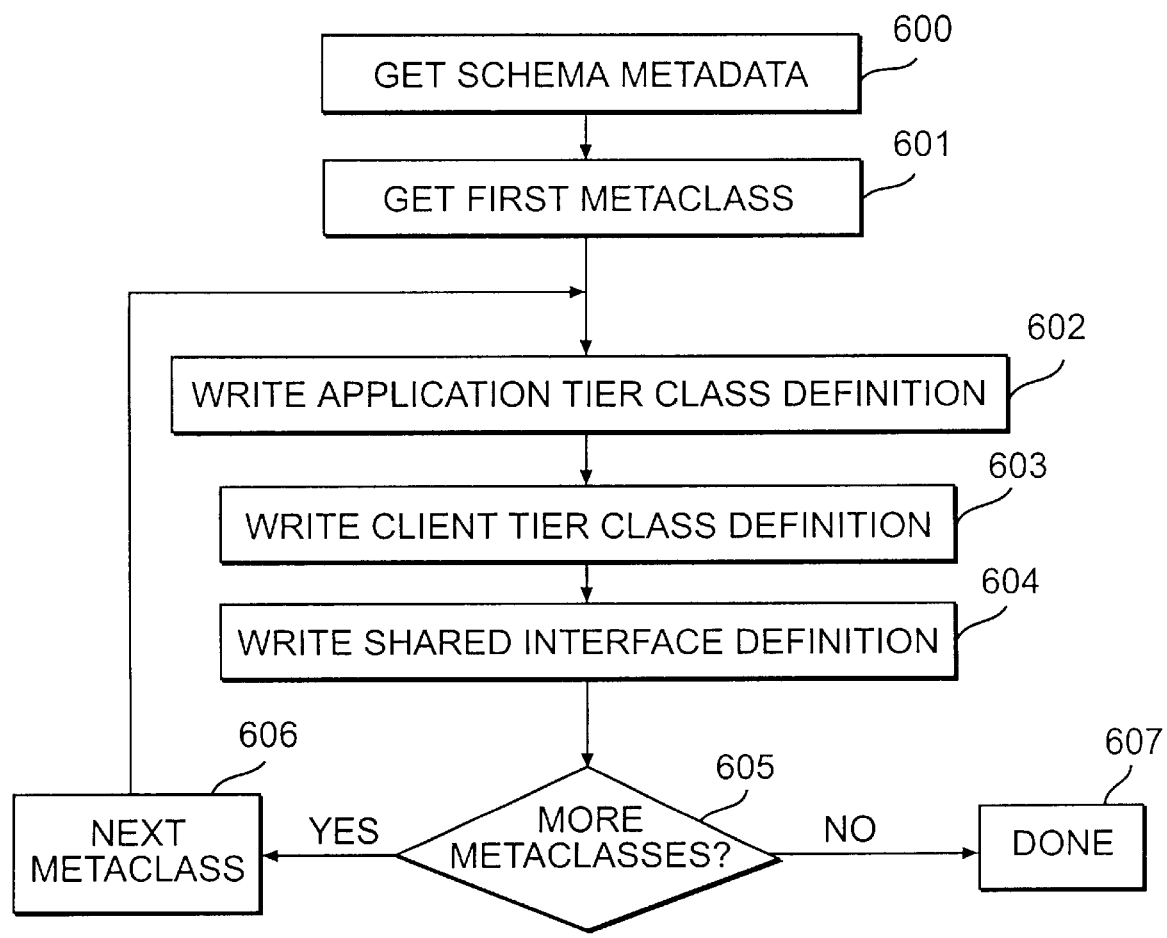
FIG. 6A is a flow diagram of a process for generating data classes from schema metadata in accordance with an embodiment of the invention.

FIG. 6A is a flow diagram of a process, in accordance with an embodiment of the invention, that generates the class and interface definitions referred to previously with reference to step 402 of FIG. 4. In step 600, the schema metadata is obtained to facilitate the automated class generation. The metadata may be, for example, provided in form of the metadata structures described with reference to FIGS. 5A and 5B. In step 601, the first metaclass is obtained from the schema metadata. The metaclass comprises metadata descriptions of the properties of the class, its attributes, and its methods.

Steps 602–604 involve building the class definition files for the application and client tiers, as well as building the shared interface file, and may be performed in any order. In step 602, a class building operation is performed to write the class definition for the application tier. The class building operation uses the metadata to provide standard declarations, and to generate standard methods, such as constructors, accessors, "new" methods and reflection methods. The class definition is typically written to a new file in a location within the file system used for storing code associated with the application server.

In one embodiment, an additional template class definition is generated that is a substantially empty subclass of the first class (or "base class") definition (i.e., the template contains little or no code in the form of additional attributes or methods). In this case, the base class may be declared as an abstract class. A developer can easily expand the capabilities of the respective base class by, for example, filling in the template with further attributes and methods as desired.

In step 603, a class building operation is performed to write the class definition for the client tier. As with step 602, the class building operation uses the metadata to provide standard declarations, and to generate standard methods, such as constructors, accessors, "new" methods and reflection methods. The class definition is typically written to a new file in a location within the file system used for storing code associated with a client application. Similar to the application tier, an additional template class definition may also be generated for the addition of further client specific code.

The class definitions for the application and client tiers share the same common interface, though the implementation of the interface may differ between the tiers. The interface is generated in step 604, and comprises, for example, a list of import classes, a series of constant declarations (e.g., for token values assigned to the individual class attributes), and a series of public method declarations. The interface is written to a location in the file system containing code files common to the application tier and the client tier. The location of the interface file is included as an import in the class definitions generated in steps 602 and 603.

In step 605, if there are no further metaclasses, the process ends (step 607). However, if further metaclasses remain in the schema metadata, the next metaclass is obtained in step 606, and the process returns to step 602 to generate class definition code from the next metaclass.

Figure 6B:
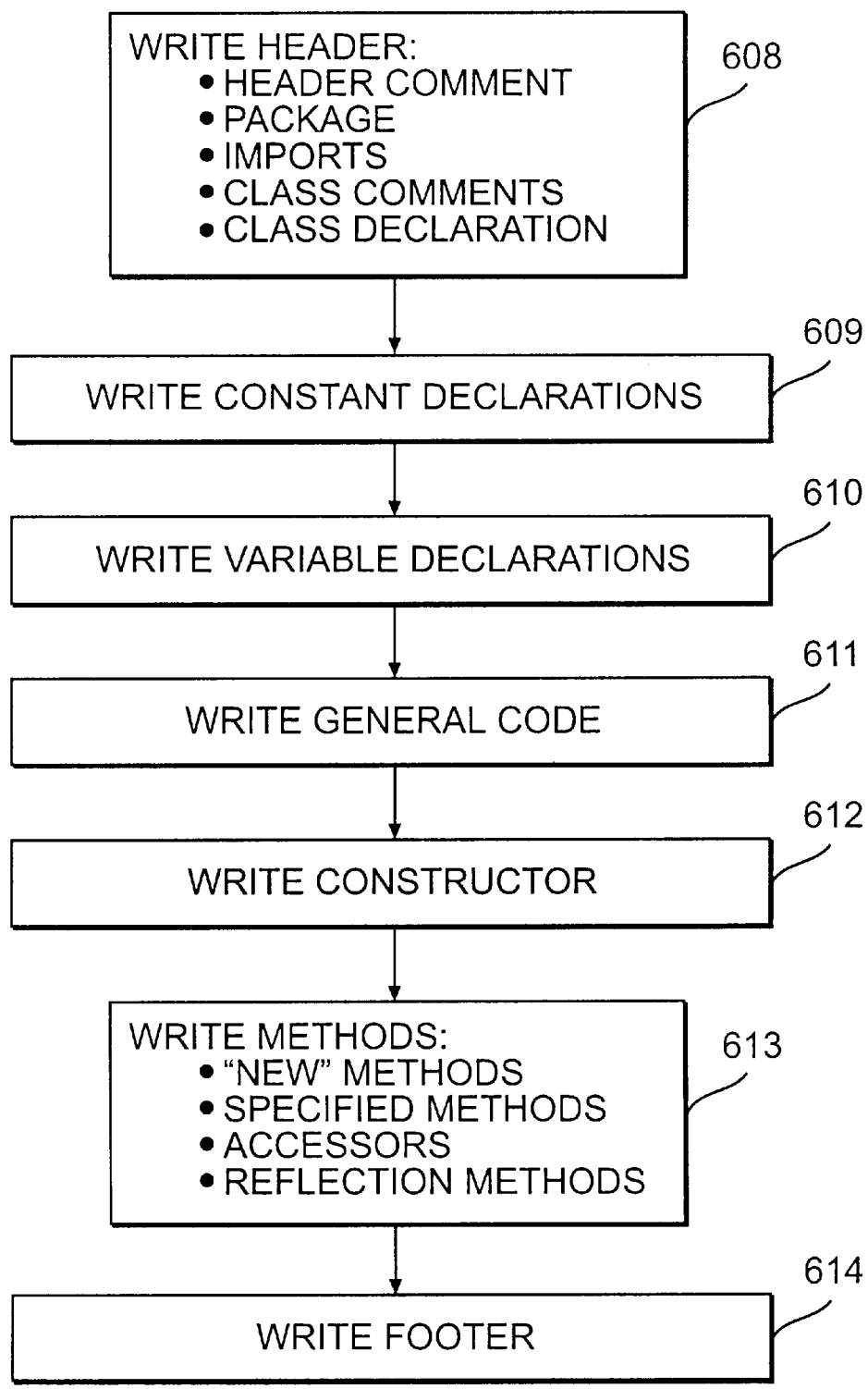
FIG. 6B is a flow diagram of a process for generating a class definition from a MetaClass instance in accordance with an embodiment of the invention.

FIG. 6B illustrates, in accordance with an embodiment of the invention, the process of the class building operation carried out in each of steps 602–604 of FIG. 6A. For the following description, character strings for building the class definitions are depicted within quotes. Each string may be written to the respective class file using known print commands. Elements inside of "< >" are evaluated to fill the character string. As an example, an interface declaration and one embodiment for writing the interface declaration to a file are provided below. The print command uses a tabprintln( ) method of a print stream instance (ps). MetaClass access methods, getName( ) and getSuperClass( ), are used to obtain the interface and superclass names to provide evaluation of elements within "< >".

---

"public interface <classname>Def extends <superclass>Def"
    ps.tabprintln("public interface" + getName( ) + "Def extends" + getSuperClass( ).getName( ) + "Def");

---

In one embodiment of the invention, generated methods for each class implement a "try-catch" format or construct. The try-catch format appears as:

---

```
try    {
       <"try" sequence of operations>
}      catch (Exception e) {
       <"catch" sequence of operations to be performed if an exception is caught>
}
```

---

In the above construct, the "try" sequence of operations (or a single operation) is executed. If one of the "try" sequence operations throws an exception, the "catch" sequence is executed. The try-catch format is advantageous because it allows for problems to be identified at runtime through the issuance of exceptions, and it provides the opportunity for action to be taken to handle those exceptions thrown (e.g., display an appropriate error message to a user based on the type of exception thrown).

In certain examples, case statements are described for directing executional flow based on the result of a test, such as the matching of a token value. Other forms of conditional statements, such as "If" statements, may be similarly applied to control executional flow.

In the embodiment described, a class file can include some or all of the following: a class header, declarations (e.g., constant and variable declarations), program code (e.g., general code, methods, and constructor methods) and/or a footer. In step 608 of FIG. 6B, the class header is written. The class header may comprise elements such as a header comment, a package declaration, a list of import declarations, class comments and a class declaration. In step 609 of FIG. 6B, any constant declarations are written to the class definition file. To begin any of steps 609–613, a comment preface to the section (e.g., "//constants", etc.) may be written to the file to indicate what follows for easier reading of the class definition.

To facilitate the use of reflection methods, integer attribute tokens may be assigned to each attribute. Access may then be made to each attribute using a general reflection method which includes an attribute token value as a parameter. In one embodiment, the integer attribute tokens are declared as constants in the common interface during step 609. To account for all attributes inherited from superclasses, as well as those explicitly declared in the current class, a chain of classes is formed from the highest superclass in the hierarchy (i.e., the superclass that does not itself have a superclass specified, or the highest superclass that is not a general framework class) to the current class. Each attribute in the chain of classes is enumerated and assigned an attribute token that is declared as a constant.

To assign attribute tokens, each attribute is given a token name, for example, by changing the attribute name to all capital letters (for constant naming conventions), and appending "ATTRIBUTE_TOKEN_" as a prefix. Each attribute token is then assigned a different token value by incrementing the token value after each attribute token assignment. The list of constants may be written to the common interface in the following form:

---

"public final static int ATTRIBUTE_TOKEN_<ATTRIBUTENAME1> = 0;"
"public final static int ATTRIBUTE_TOKEN_<ATTRIBUTENAME2> = 1;"
"public final static int ATTRIBUTE_TOKEN_<ATTRIBUTENAME3> = 2;"
etc.

---

In step 610 of FIG. 6B, the variable declarations are written based on the schema attribute metadata for the current class (e.g., the Vector of MetaAttribute structures). Each MetaAttribute is enumerated and its MetaDataType queried to determine the corresponding declaration (e.g., "myJavaDeclaration") for the given programming language. The variable name may be generated by, for example, adding the prefix "my" to the attribute name. An example of a variable declaration string for a single attribute is:

"private<myJavaDeclaration>my<attributename>;"

The variable declarations are generated in the same manner for the client and server base classes. In accordance with an embodiment of the invention, variable declarations are not automatically generated for the common interface and the template classes.

In step 611, general code is written to the class file in an automated fashion. For the client and server base classes, the general code comprises the character string elements of the Vector "myCode" for the current MetaClass. For the common interface, the general code comprises the character string elements of the Vector "myInterfaceCode" for the current MetaClass. Each string element is enumerated from the respective Vector, and written to the class file. In accordance with an embodiment of the invention, general code is not written to the template classes.

In step 612, for the client and server base classes, a standard constructor is written to the class file. No constructor is necessary for the common interface or template classes. The automated constructor may include setting default values for the variables (attributes). The default values may be determined by enumerating the MetaAttributes of the MetaClass, and determining a default value from the MetaAttribute metadata and the corresponding MetaDataType. An example of a constructor is as follows:

```
"public <classname>( );"
"{"
"    super( );"
"    <attributename> = <defaultvalue>;"
"    <attributename> = <defaultvalue>;"
         etc.
"}"
```

In step 613, the methods of the class file are written. No methods are written to the template classes because the methods are inherited from the base classes. Only the method declarations are written to the common interface. "New" method code is generated for those MetaAttributes whose "myOfferNewMethodFlag" is true. Method code is generated for each of the methods specified in the Vector "myMethods" of MetaMethod elements. Accessor methods are generated for the class variables (i.e., for the attributes described by the MetaAttributes in the Vector "myAttributes"). Also, reflection methods are generated that allow for the attributes to be accessed by attribute token.

In step 614, the footer is generated for the base classes, template classes and the common interface. In one embodiment, the footer comprises a close bracket symbol "}" that corresponds to the open bracket symbol generated in the class header.

Further description is provided below with respect to the automated generation of code for the class header and method portions of the generated class files and common interface.

Class Header

As stated above with reference to FIG. 6B, the class header comprises a header comment, a package declaration, a series of import declarations, class comments, and a class declaration. The header comment may include, for example, a standard copyright notice and/or the date of class generation. The automated code generation writes the comment to the file (with appropriate comment line symbols, e.g., "/*" or "//"), for example, using known file print commands. The class comments may comprise more class-specific comments, and may be written to the class file in the same manner as the header comment.

The package declaration typically corresponds to the target directory for the class file which depends on whether the class definition is being generated for the client tier ("client") or application tier ("server"), and whether the class definition is a base class, a template, or the shared interface. A case statement may be used to write the appropriate package declaration based on the target, where the target is one of the following: client base class, client template class, server base class, server template class, or common interface. An example set of packages for class targets is given below:

| target | package declaration |
|---|---|
| client base class | "package com.cmpny.group.app.client.core.base;" |
| client template class | "package com.cmpny.group.app.client.core;" |
| server base class | "package com.cmpny.group.app.server.core.base;" |
| server template class | "package com.cmpny.group.app.server.core;" |
| common interface | "package com.cmpny.group.app.common.core;" |

The imports for the current class are determined by target. For example, for the client base class and the server base class, the path name for the package containing the interface is declared as an import. The path names for other elements of the three-tier framework that may be integrated with the generated class, such as change objects, may be declared as imports as well. For the client base class, the application server base class and the common interface, the string elements of the import Vector "myImports" are enumerated to form import declarations that are added to those already written to the class file. The template class files may forego the addition of imports.

The class declaration is also target dependent. For the common interface, the interface name may be generated by, for example, appending a standard interface suffix, such as "Def," to the class name specified in the metadata. If there is a superclass specified in the metadata, an "extends" phrase may be added to the declaration which specifies a superclass interface name. The superclass interface name is generated by appending the interface suffix to the superclass name. If there is no superclass, then the extends phrase is omitted. The declaration for the interface is as follows:

| superclass: | "public interface <classname>Def extends <superclass>Def" |
|---|---|
| no superclass: | "public interface <classname>Def" |

For the client and server base classes, the superclass is assumed to be "Object" if no superclass is specified. The class declaration for the client and server base classes is, for example:

```
"public abstract class <classname> extends <superclass>
implements <classname>Def"
"{"
```

For the client and server template classes, the superclass is the respective client or server base class with the path-name (as given by the target packages) for the base class appended as a prefix to the class name. Thus, for the template classes, the respective declarations are:

| | |
|---|---|
| client: | "public class <classname> extends <clientBasePackage>.<classname>" |
| | "{" |
| server: | "public class <classname> extends <serverBasePackage>.<classname>" |
| | "{" |

"New" Methods

"New" methods ("new<attributeName>," not "new<constructor>") are provided for those attribute types, such as Vectors, that contain objects as elements. The "new" method provides a mechanism to obtain new instances of the object class forming each element of the Vector, and, in one embodiment, to initialize the mirror attribute of the new instance to refer to the class instance containing the Vector. The new class instances are obtained, for example, from the public store by invoking a method of the object representing the public store which returns a new instance for a specified class ID. The public store object calls a factory method of a class factory to construct the new class instance.

To generate a "new" method, the element "myCollectionContent-Name" of a MetaAttribute's associated MetaDataType is queried to determine the class name of the desired class instance to be created by the "new" method. The method declaration can then be generated as illustrated below, in terms of the desired class's corresponding interface (generally "<classname>Def"). In one embodiment, the method name is generated by appending "new" as a prefix to the desired class name.

"public<desiredClassName>Def new<desiredClassName>( )"

(e.g., "public SampleObjectDef newSampleObject( )")

For the common interface, a semicolon ";" is appended to the above method declaration. For the client and server base classes, a method body is generated in a try-catch format, for example, to obtain a new instance or to catch an exception in the event a new instance is not obtained. Typically, the new instance is obtained by calling a method from a system component that handles the instantiation of the desired class within the context of the database. The following example of a "new" method body is provided in accordance with an embodiment of the invention. The method body incorporates the use of the factory class (e.g., from "myFactoryClass") for lookup of class token values, and assumes the base class is a subclass of a "StoredObject" class that supports the use of a public store (e.g., in the form of an object cache component) that performs instantiation. The example form of the method body is:

```
"{"
"    try    {"
"        SchemaInfoDef schema = getIdentity( ).getClassIdentity( ).getSchema( );"
"        ClassIdentityDef classID = schema.getClassForToken(<factory ClassName>.CLASS_TOKEN_<desiredClassName>);"
"        <desiredClassName>Def newInstance = (<desiredClassName>Def) (getPublicStore( ).newInstanceForClassIdentity(classID));"
"        newInstance.set<mirrorAttributeName>(this);"
"        return newInstance;"
"    }   catch (exception e)    {"
"        getPublicStore( ).handleException(e);"
"        return null;"
"    }"
"{"
```

Specified Methods

For the specified methods, i.e., those methods described by the MetaMethod elements of the Vectors "myMethods" and "myPassedMethods," method declarations are added to the common interface. Those method declarations may include the comment strings specified in the respective string Vector "myComments" of the respective MetaMethod structure. The Java (or other programming language) declaration for the method's return data type is obtained from the data type metadata (e.g., from the MetaDataType structure "myDataType" of the MetaMethod), and the name of the method is obtained directly from the method metadata (e.g., "myName"). The parameter data types and names are obtained by enumerating the MetaParameters of the MetaMethod and querying the associated MetaDataType of each MetaParameter. If the string "myThrowsType" is not null, a "throws" phrase is added to the declaration, including the specified data type. Example declarations in accordance with an embodiment of the invention are provided below:

| |
|---|
| (myThrowsType==null): "public <returnDataType> <methodName>(<parameter DataType> <parameterName>, <parameterDataType> <parameterName> <, ...>)" |
| (myThrowsType!=null): "public <returnDataType> <methodName>(<parameter DataType> <parameterName>, <parameterDataType> <parameterName> <, ...>) throws <myThrowType>" |

The client and server base classes receive the same general method declarations as shown above. Also, if the "myPassToAttribute" structure of the MetaMethod is null, the string elements of the Vector "myBodyParts" are enumerated and printed to the class file to complete the body of the respective method. If the "myPassToAttribute" is not null, meaning that the processing of the method is to be carried out by an identically named "passed" method of another class designated by "myPassToAttribute," the method body may be constructed, for example, as shown below, to make a further call to the other class and to return the result. The parameters of the new call include the same parameters as the current method with the addition of "this" to specify the current class as the caller, if "myPassThisFlag" is true. For example:

```
(myPassThisFlag):
   "{"
   "   return get<attributeName>( ).<methodName>(this, <parameter>,
<parameter>, <etc.>);"
   "}"
(!myPassThisFlag):
   "{"
   "   return get<attributeName>( ).<methodName>(<parameter>,
<parameter>, <etc.>);"
   "}"
```

Passed methods are generated in similar fashion to the specified methods described above. However, if "myPassThisFlag" is true, the parameter list in the method declaration includes an entry for the calling class, such as by adding the corresponding class type or interface type of the calling class (e.g., "<className>Def") followed by "caller" as the standard parameter name for the calling class.

Accessor Methods

Accessor methods are automatically generated for each attribute described in a MetaClass instance. As with the other described methods, the common interface receives the method declarations for the "Get" and "Set" accessor methods, whereas the client and server base classes receive the complete methods, including declaration and body. A further protected accessor method, "doSet," is generated in one embodiment for use by certain instances of the "Set" method, as well as by the reflection methods. The protected "doSet" method is not included in the public interface of the class.

The "Get" declaration is determined from the data type of the attribute and its corresponding Java (or other programming language) interface declaration. An example "Get" declaration is as follows:

"public<dataType.JavaInterfaceDeclaration>get<attributeName>( )"

The "Get" accessor method is designed to return the value of the variable targeted by the method, or its corresponding null value if the variable value cannot be obtained. For nonpersistent attributes, i.e., those attributes not saved in the database, the "Get" accessor may simply return the variable value using the phrase "return <variable name>" within the try-catch format. For persistent attributes, method calls may be embedded in the generated code to access the "public store" for the variable value. In one embodiment, the following two "Get" method forms are used, the first being used if "myMirrorCollectionClass" is null (i.e., the attribute is not a collection or set, such as a Vector of classes), and the second being used if "myMirrorCollectionClass" is not null.

```
(myMirrorCollectionClass = null):
   "{"
   "   try      {"
   "      if(getNeedsToBeReadFromStore( )) readFromStore( );"
   "      return <variableName>;"
   "   }  catch (Exception e) }"
   "      getPublicStore( ).handleException(e);"
   "   return <nullValueString>;"
   "   }"
   "}"
(myMirrorCollectionClass != null):
   "{"
   "   try      {"
   "      if (<variableName> == null) {"
   "         <variableName> = new RelationshipAwareLiveSet(getPublicStore( ),
getClassInfo( ).getAttributeForName("<attributeName>"), this);"
   "      }"
   "      return <variableName>"
   "   }  catch (Exception e) {"
   "      getPublicStore( ).handleException(e);"
   "      return <nullValueString>;"
   "   }"
   "}"
```

In the above examples, for the datatype specified for the attribute, if "myPassByCopyFlag" is true, the return phrase "return <variableName>" is replaced with the return phrase "return new <dataTypeJavaDeclaration> (<variableName>);" to return a copy of the variable of the data type specified for the attribute.

The "Set" accessor method is designed to write a value to the given variable (attribute), with the new value specified as a method parameter. In one embodiment, for collection attributes, such as Vectors of classes (i.e., those attributes whose "myMirrorCollectionClass" is not null), no "Set" method is generated. The declaration of the "Set" method may be generated as follows:

```
"public void set<attributeName>(<dataTypeJavaInterfaceDeclaration>
<attributeName>)"
```

The "Set" declaration alone is written to the common interface. The declaration and method body are written to the client and server base classes. In one embodiment, if the attribute is persistent and has a designated change object, the "Set" method initiates a transaction with the public store, obtains a change object with the appropriate attribute changes, performs the change using the change object, and ends the transaction with the public store. If the attribute is not persistent or does not have an assigned change object, the "Set" method calls the "doSet" method. "Set" method body examples are provided below, with the first corresponding to a persistent attribute with a change object and the second corresponding to a nonpersistent attribute or one without an assigned change object. (Note: the attribute's "owning" class is the class containing the attribute.)

```
"    if (<variableName> == null)"
"        <variableName> = new <dataTypeJavaDeclaration>( );"
"    <variableName>.copy(<attributeName>);"
```

Reflection Methods

With respect to reflection methods, the common interface receives the declarations, and the client and server base classes receive the full methods. The reflection methods provide access to the attributes of a given class, including those inherited from superclasses, through the specification of an AttributeInfo structure that contains the attribute token of the desired attribute. A case statement is used, for example, to call either the "Get" or "doSet" accessor method for the desired attribute, as appropriate, based on which reflection method is invoked and the resolution of the attribute token. Examples of "Get" related reflection methods in accordance with an embodiment of the invention are provided below.

```
"{"
"    try    {"
"        getPublicStore( ).beginTransaction( );"
"        <changeObjectName> changeObject = new <changeObjectName>(this,
<attribute'sOwningClass'sInterfaceName>.ATTRIBUTE_TOKEN_<attributeName(all caps)>, <attributeName>);"
"        getPublicStore( ).performChange(changeObject);"
"        getPublicStore( ).endTransaction( );"
"    }   catch (Exception e) {"
"        getPublicStore( ).handleException(e);"
"    }"
"}"
"{"
"    doSet<attributeName>(<attributeName>);"
"}"
```

Similar to the "Set" methods, "doSet" methods are not generated for collection attributes, such as Vectors of classes (i.e., those attributes whose "myMirrorCollectionClass" is not null). The "doSet" accessor methods are written to the client and server base classes, but, as stated previously, no declaration is written to the common interface for these protected methods. The "doSet" method is an internal method. Any transaction-based activities are handled by the caller. An example of a "doSet" method is provided below in accordance with an embodiment of the invention.

```
"protected void doSet<attributeName>(<dataTypeJavaInterfaceDeclaration>
<attributeName>)"
"{"
"    try    {"
"        if (getNeedsToBeReadFromStore( )) readFromStore( );"
"        <variableName> = <attributeName>;"
"    } catch (Exception e) {"
"        getPublicStore( ).handleException(e);"
"    }"
"}"
```

If "myMirrorAttribute" is not null and "myPassByCopyFlag" for the attribute's data type is true, the string "<variableName>=<attributeName>;" may be replaced by:

```
"public Object getValueOrReferenceForAttribute(AttributeInfoDef attribute)"
"{"
"    return getValueForAttribute(attribute, true);"
"}"
"public Object getValueForAttribute(AttributeInfoDef attribute)"
"{"
"    return getValueForAttribute(attribute, false);"
"}"
"public Object getValueForAttribute(AttributeInfoDef attribute, boolean idOnly)"
"{"
"    try      {"
"        Object returnValue = null;"
"        switch(attribute.getAttributeToken( )) {"
"        <case 1>"
"        <case 2>"
"        <etc.>"
"        }"
"        return returnValue;"
"    } catch (exception e) {"
"        getPublicStore( ).handleException(e);"
"        return null;"
"    }"
"}"
```

For attributes that reference user classes, in one embodiment, the case code "<case #>" is:

```
"    case <attribute'sOwningClass'sInterfaceName>.ATTRIBUTE_TOKEN_<attributeName(all caps)>:"
"        if (idOnly) {"
"            if (get<attributeName>( ) == null)"
"                returnValue = null;"
"            else"
"                returnValue = get<attributeName>( ).getIdentity( );"
"        } else     {"
"            returnValue = get<attributeName>( );"
"        }"
"        break;"
```

For attributes that do not reference user classes, the case code is:

```
"    case <attribute'sOwningClass'sInterfaceName>.ATTRIBUTE_TOKEN_<attributeName(all caps)>:"
"        returnValue = get<attributeName>( ):"
"        break;
```

The "Set" related reflection method also uses a case statement to resolve attribute tokens for invocation of the appropriate accessor, in this case, the "doSet" method. Those attributes that represent a collection (e.g., those attributes for which "myMirrorClassCollection" is not null) are not included in the method. An example of a "Set" related reflection method is provided below.

```
"public void setValueForAttribute(AttributeInforDef attribute, Object value)"
"{"
"    try      {"
"        switch(attribute.getAttributeToken( )) {"
"        <case 1>"
"        <case 2>"
"        <etc.>"
"        }"
"    } catch (Exception e) {"
"        getPublicStore( ).handleException(e);"
"    }"
"}"
```

The case code ("case #") takes the form of:

```
"    case <attribute'sOwningClass'sInterfaceName>.ATTRIBUTE_TOKEN
_<attributeName(all caps)>:"
"        doSet<attributeName>((<dataTypeJavaDeclaration>)value);"
"        break;"
```

Thus, user class files and interfaces are automatically generated from the schema metadata to reduce redundant programming effort, and to provide automated integration of the user class files with other elements of the three-tier framework.

Generation of Factory Classes

As referred to previously with respect to step 403 of FIG. 4, a factory object class is generated from the schema metadata. Classes that are part of the framework (e.g., non-data objects) are imported into the factory class, and a standard constructor is generated. Class tokens are generated as constant declarations by enumerating the MetaClass Vector "myCoreClasses" and individually assigning token names and token values. The token value is incremented between each new MetaClass. The token names may be assigned by adding a token prefix to each class name. For example, each token assignment may appear as a constant declaration as follows:

"public final static int CLASS_TOKEN_<className(all caps)>=
    <tokenNumber>;"

A factory method is generated that will receive a token value (or some other reference that is transformed into a token value) and resolve a case statement based on the specified token value to instantiate the desired class. Abstract classes need not be included in the factory method as abstract methods are not instantiated. If the factory class is generated for the server, the server template package is appended to the class name as a prefix for the class constructor. For the factory class generated for the client, the client template package is similarly appended to the constructor. In one embodiment of the invention, the factory method is configured to assign an "identity" class instance to the newly instantiated data class (or "core" class). The identity instance is set with a class identity value and a serial number. Further, the public store is set for the new class instance before returning the class instance to the caller of the factory method. An example factory method is shown below:

```
"public IdentifiableDef newInstanceForReference(ReferenceDef ref)"
"throws Factory Exception"
"    StoredObject newObject = null;"
"    try    {"
"        ClassIndentityDef classId = null;"
"        Identity newIdentity = null;"
"        int classToken = ref.getClassIdentity( ).getClassToken( );"
"        switch (class Token) {"
"            case CLASS_TOKEN_<className(all caps)>:"
"                newObject = new <(server/client)templatePakcage>.<class Name>( );"
"                newIdentity = new Identity( );"
"                classId = getSchema( ).getClassForToken(CLASS_TOKEN_<className(all caps)>);"
"                newIdentity.setClassIdentity(classId);"
"                newIdentity.setSerialNumber(ref.getSerialNumber( ));"
"                newIdentity.setIdentitySpace(ref.getIdentitySpace( ));"
"                newObject.setIdentity(newIdentity);"
"                break;"
"            <further case statements - one for each non-abstract class>"
"            default:"
"                break;"
"        }"
"        if(newObject == null) {"
"            throw new FactoryException( );"
"        } else    {"
"            newObject.setNeedsToBeReadFromStore(false);"
"            newObject.setPublicStore(getPublicStore( ));"
"            AttributeInfoDef aid = newObject.getClassInfo( ).getAttributeForToken(CoreObjectDef.ATTRIBUTE_TOKEN_HASBEENDELETED);"
"            newObject.setValueForAttribute(aid, new Boolean(false));"
"        }"
"    } catch (SchemaException e) { }"
"    return newObject;"
"}"
```

The factory method above takes advantage of inherited methods and attributes of the new object instance to set public store information (e.g., provide a reference to the respective object cache component), as well as to set identity information on the new object instance. In one embodiment, each data object is a subclass of the framework "StoredObject" class which is a subclass of a framework "AwareObject" class. The StoredObject class provides the inherited methods for communicating with the public store. The AwareObject class implements an IdentifiableDef interface that provides methods for accessing class information such as class ID and serial number (object ID). The AwareObject class also provides methods for obtaining a list of class attributes and token values, and for accessing attribute information via token value, for example.

Generation of Database Tables

Figure 7A:
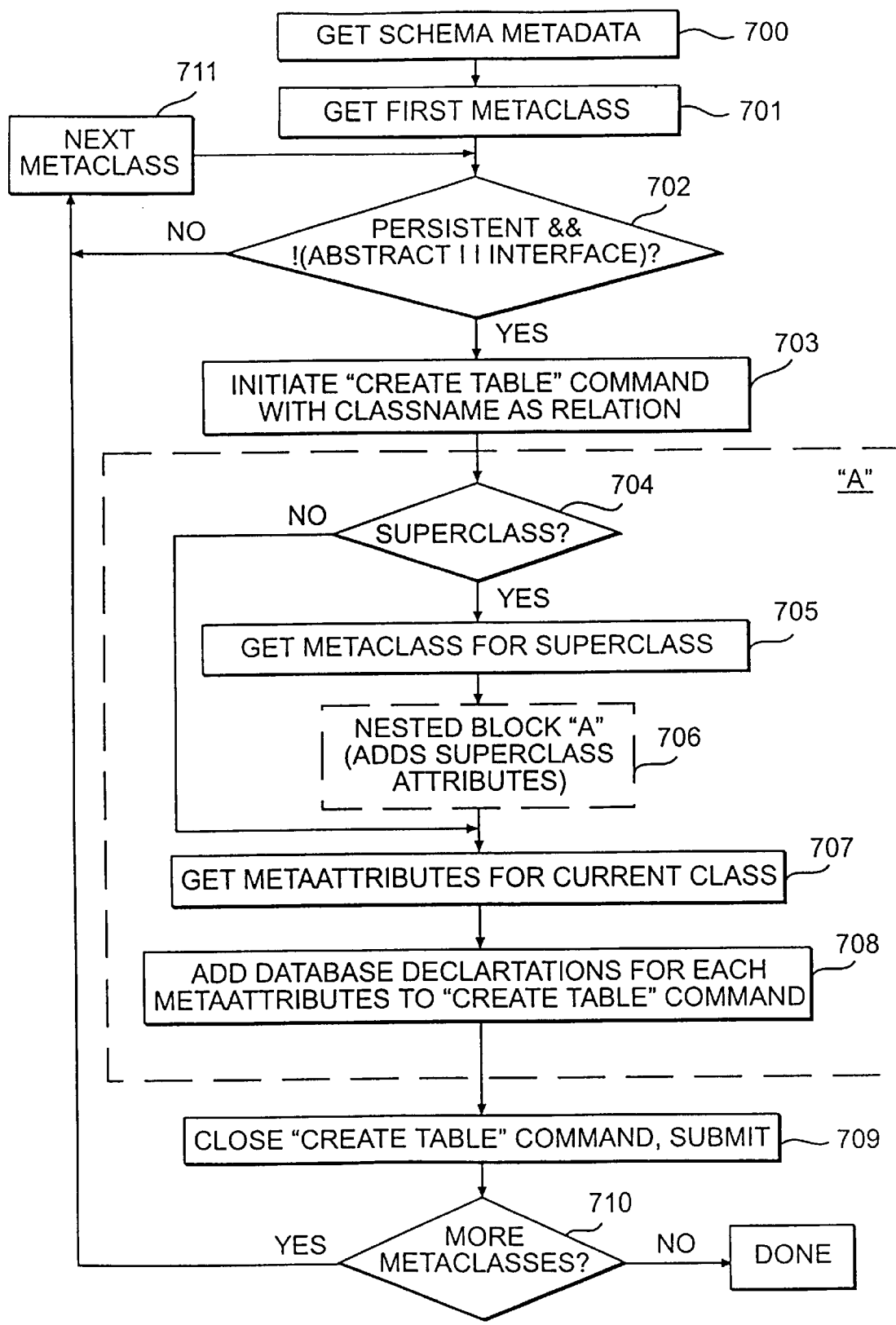
FIG. 7A is a flow diagram of a process for generating database "create table" commands from schema metadata in accordance with an embodiment of the invention.
Figure 7B:
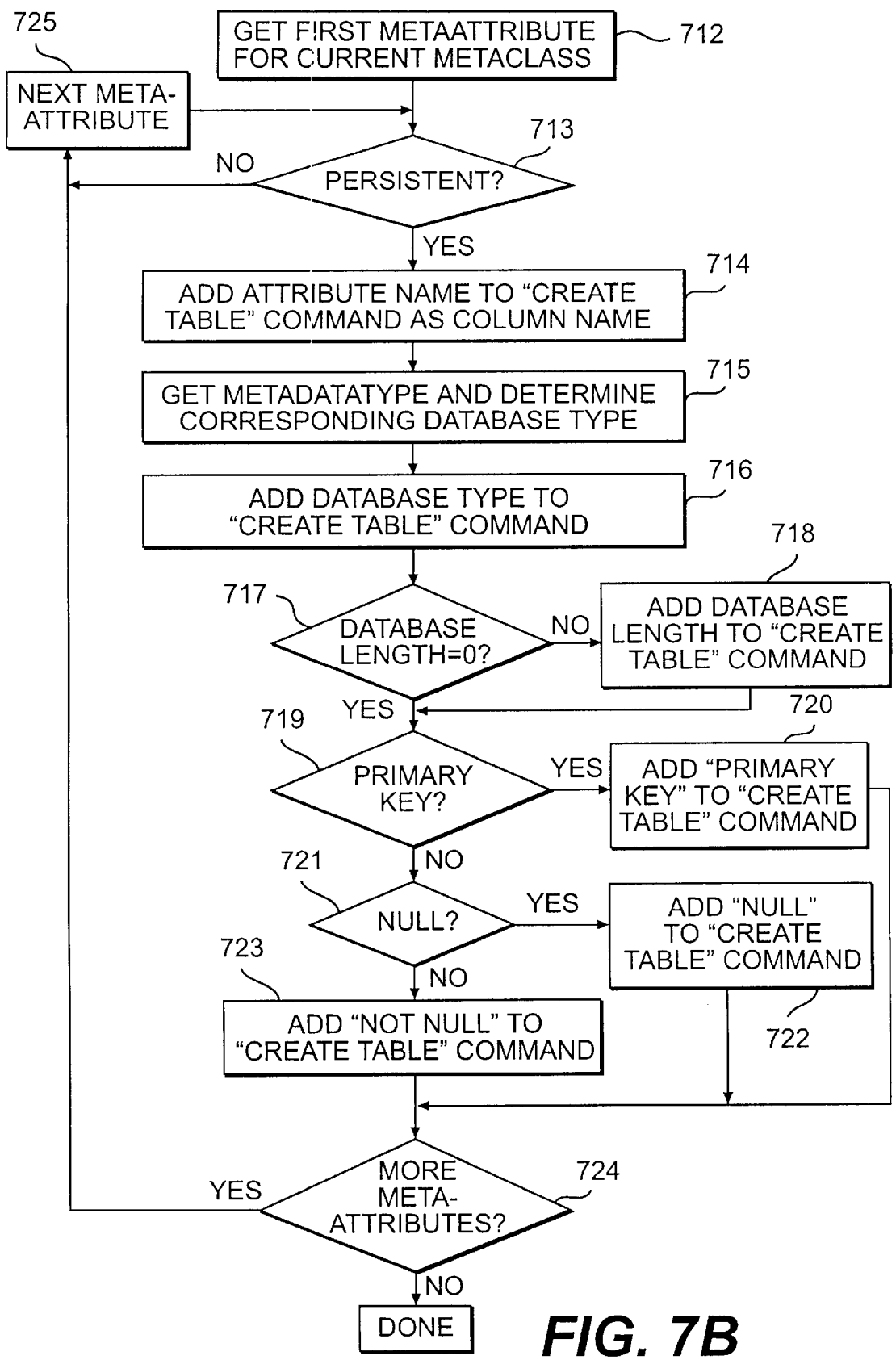
FIG. 7B is a flow diagram of a process for generating an attribute database declaration from schema metadata in accordance with an embodiment of the invention.

FIGS. 7A and 7B are flow diagrams illustrating a process for generating database tables from schema metadata in accordance with an embodiment of the invention. The processes of FIGS. 7A and 7B may be implemented, for example, within schema class 907 of FIG. 9, and executed by an instance of the schema class at run time during initial start-up.

The database tables are generated through a "create table" command that specifies the table name (or relationship) and the attributes that make up the table. The following description refers to how to generate the a "create table" command from schema metadata. The embodiment described generates a separate create table command, and therefore a separate database table, for each MetaClass instance. Other embodiments may, for example, generate one database table for multiple MetaClass instances, or multiple database tables for a single MetaClass instance. An example of a create table command, in accordance with an embodiment of the invention, is provided below.

```
CREATE TABLE <className> (
    <attributeDatabaseDeclaration>,
    <attributeDatabaseDeclaration>,
    <etc.>
)
```

The create table commands may be included together in a script format and submitted in a "create database" command set as shown below, for example.

```
CREATE DATABASE <databaseName>
USE <databaseName>
CREATE TABLE <className1> (
    <attributeDatabaseDeclaration>,
    <attributeDatabaseDeclaration>,
    <etc.>
)
CREATE TABLE <className2> (
    <attributeDatabaseDeclaration>,
    <attributeDatabaseDeclaration>,
    <etc.>
)
<etc.>
```

In FIG. 7A, the process begins by obtaining the schema metadata in step 700. In step 701, the first MetaClass instance is obtained from the schema metadata, for example, using an enumeration process on the Vector of MetaClasses "myCoreClasses." In step 702, a determination is made whether the current MetaClass is persistent, not abstract, and not an interface. If the MetaClass is abstract, is an interface or is not persistent, the process continues at step 710, bypassing generation of a "create table" command for the current MetaClass. If, however, the MetaClass is persistent, not abstract, and not an interface, the process continues at step 703, where the "create table" command is initiated, specifying the MetaClass class name as the relation or table name.

In step 704, a determination is made whether the current MetaClass has a superclass specified. If there is no superclass specified (mySuperClass==null), the process continues at step 707 in which the MetaAttributes ("myAttributes") are obtained for the current MetaClass instance. In step 708, the database declarations for each attribute are added to the "create table" command. The process of step 708 is further described in FIG. 7B.

If, at step 704, there is a superclass specified (mySuperClass!=null), then the MetaClass instance for the specified superclass is obtained in step 705. In Step 706, the superclass MetaClass is processed as described in steps 704–708 in a nested process ("A"). Nested process "A" can be executed recursively to process each superclass level in the class hierarchy. Step 706 ensures that attributes inherited from the superclass (and its superclass, and so on) are added to the "create table" command. After step 706, the process continues at step 707.

In step 709, the "create table" command is closed (e.g., by appending a close parenthesis ")"), and the command is submitted, via the data store management component, to the database management system to configure the database. If more MetaClasses remain, as determined in step 710, the next MetaClass is obtained in step 711, and the process returns to step 702. If there are no more MetaClasses in step 710, the process is completed. Submission of the finished "create table" commands may also be performed as a set, as described above for a "create database" command set.

FIG. 7B further describes the process of adding attribute database declarations to the "create table" command. In accordance with an embodiment of the invention, the attribute database declaration has the following form:

```
<attributeName> <attributeDatabaseType> <(<databaseLength>)>
<"PRIMARY KEY"/"NULL"/"NOT NULL">
```

In step 712 of FIG. 7B, the first MetaAttribute instance is obtained from the MetaAttributes for the current MetaClass, for example, through an enumeration of Vector "myAttributes." In step 713, a determination is made whether the current attribute is persistent (myPersistentFlag==true). If the current attribute is not persistent, the process continues at step 724, bypassing the current MetaAttribute. If the current attribute is persistent in step 713, the attribute name is added to the "create table" command in step 714 to specify a column name in the table.

In step 715, the MetaDataType instance of the current MetaAttribute instance is queried to determine the database type ("myDatabaseDeclaration") of the current attribute. In step 716, the database type is added to the "create table" command to specify the column type. In step 717, if the MetaDataType database length string "myDatabaseLength" is not "0," in step 718, the database length is added to the "create table" command in the form "(<myDatabaseLength>)". Step 718 proceeds to step 719. If "myDatabaseLength" is "0," the process proceeds from step 717 to step 719.

Steps 719–723 handle the setting of the database null declaration. In step 719, if "myPrimaryKeyFlag" is true, "PRIMARY KEY" is added to the "create table" command in step 720, and processing continues at step 724. If, in step 719, "myPrimaryKeyFlag" is false, processing continues at step 721. In step 721, if "myNullFlag" is true, "NULL" is added to the "create table" command in step 722, and processing continues at step 724. If, in step 721, "myNullFlag" is false, "NOT NULL" is added to the "create table" command in step 723 before proceeding to step 724. In step 724, if any MetaAttribute instances remain for the current MetaClass instance, the next MetaAttribute instance is obtained in step 725, and the process returns to step 713. Otherwise, the process of entering attribute database declarations for the current "create table" command is complete.

Thus, an integrated three-tier application framework with automated class and table generation has been described in conjunction with one or more specific embodiments. The invention is defined by the claims and their full scope of equivalents.

We claim:

1. A computer-implemented method comprising:

obtaining a schema describing a data class;

generating code for use in a multi-tier run-time environment automatically from the schema, the multi-tier run-time environment including a client tier and an application tier, the generated code including a client class for the client tier and a server class for the application tier;

bringing the generated code into a run-time environment having a set of framework components, the components including the client tier, the application tier, and a database tier;

initiating a transaction in the client tier, the transaction including a change to be applied to a first data object, the first data object being an object of the client class cached by the client tier, the first data object representing a datum;

creating in the client tier a change object representing the change to be applied;

communicating the change object from the client tier to the application tier;

in the application tier, applying the change represented by the change object thus communicated to a second data object, the second data object being an object of the server class cached by the application tier, the second data object representing said datum represented by the first data object;

in the application tier, converting the second data object with the change thus applied into a representation suitable for use by the database tier;

communicating the representation from the application tier to the database tier;

in a manner responsive to the representation thus communicated, changing a database entry in the database tier, the database entry including said datum represented by the first and second data objects;

notifying the application tier that the database entry has been changed;

notifying the client tier that the datum represented by the second data object has been changed;

in the client tier, changing a value in a field of the first data object so as to reflect the changed datum;

in the client tier, closing the transaction; and making the first data object with the field thus updated available for further use in the run-time environment.

2. The method of claim 1, wherein generating the code is accomplished using meta-data that is reflected in the generated code.

3. The method of claim 1, wherein creating the change object in the client tier includes creating a change object described in terms of meta-data.

4. The method of claim 1, wherein communicating the change object to the application tier includes serializing the change object using meta-data.

5. The method of claim 1, wherein applying the change to the second data object is accomplished using meta-data.

6. The method of claim 1, wherein converting the second data object into a representation suitable for use by the database tier includes using meta-data to facilitate conversion of the second data object into said representation.

7. The method of claim 1, wherein notifying the client tier that the datum represented by the second data object has been changed is accomplished using meta-data.

* * * * *